(12) United States Patent
Wei

(10) Patent No.: US 7,707,563 B2
(45) Date of Patent: Apr. 27, 2010

(54) SYSTEM AND METHOD FOR NETWORK-BASED COMPUTING

(75) Inventor: Coach K. Wei, Boston, MA (US)

(73) Assignee: Nexaweb Technologies Inc, Burlington, MA (US)

( * ) Notice: Subject to any disclaimer, the term of this patent is extended or adjusted under 35 U.S.C. 154(b) by 1029 days.

(21) Appl. No.: 10/754,782

(22) Filed: Jan. 9, 2004

(65) Prior Publication Data

US 2004/0143823 A1     Jul. 22, 2004

Related U.S. Application Data

(60) Provisional application No. 60/439,394, filed on Jan. 10, 2003.

(51) Int. Cl.
*G06F 9/45*     (2006.01)
(52) U.S. Cl. .................................................... 717/140
(58) Field of Classification Search ......... 717/100–108, 717/114–118, 136–148, 165, 124; 709/203
See application file for complete search history.

(56) References Cited

U.S. PATENT DOCUMENTS

| | | | | | |
|---|---|---|---|---|---|
| 4,667,290 | A | * | 5/1987 | Goss et al. ................... | 717/147 |
| 5,943,424 | A | * | 8/1999 | Berger et al. .................. | 705/64 |
| 6,003,038 | A | * | 12/1999 | Chen ....................... | 707/103 R |
| 6,209,124 | B1 | * | 3/2001 | Vermeire et al. ............. | 717/114 |
| 6,226,675 | B1 | * | 5/2001 | Meltzer et al. .............. | 709/223 |
| 6,244,545 | B1 | * | 6/2001 | McCrary ..................... | 248/73 |
| 6,286,134 | B1 | * | 9/2001 | Click et al. .................. | 717/138 |
| 6,341,372 | B1 | * | 1/2002 | Datig ......................... | 717/136 |
| 6,343,310 | B1 | * | 1/2002 | DiRienzo ..................... | 709/200 |
| 6,389,590 | B1 | * | 5/2002 | Miller et al. ................. | 717/140 |
| 6,526,570 | B1 | * | 2/2003 | Click et al. .................. | 717/146 |
| 6,539,396 | B1 | * | 3/2003 | Bowman-Amuah ..... | 707/103 R |
| 6,542,912 | B2 | * | 4/2003 | Meltzer et al. ........... | 715/501.1 |
| 6,550,057 | B1 | * | 4/2003 | Bowman-Amuah ......... | 717/126 |
| 6,601,234 | B1 | * | 7/2003 | Bowman-Amuah ......... | 717/108 |
| 6,615,235 | B1 | * | 9/2003 | Copeland et al. ............ | 709/203 |
| 6,629,313 | B1 | * | 9/2003 | Rowe et al. .................. | 717/136 |
| 6,640,238 | B1 | * | 10/2003 | Bowman-Amuah ......... | 709/201 |
| 6,640,244 | B1 | * | 10/2003 | Bowman-Amuah ......... | 709/207 |
| 6,643,652 | B2 | * | 11/2003 | Helgeson et al. .............. | 707/10 |
| 6,651,248 | B1 | * | 11/2003 | Alpern ....................... | 717/162 |
| 6,766,511 | B1 | * | 7/2004 | Berry et al. .................. | 717/128 |

(Continued)

OTHER PUBLICATIONS

Rao et al, "Compiled query execution engine using JVM", IEEE ICDE, pp. 1-12, 2006.*

(Continued)

*Primary Examiner*—Ted T Vo
(74) *Attorney, Agent, or Firm*—AKC Patents, LLC; Aliki K. Collins

(57) ABSTRACT

A network-based computing system that automates, simplifies, and optimizes the compilation, deployment, and execution of an application by any type of a client machine connected to a server via any type of a network connection. The system includes a client runtime environment, a server runtime environment and an object-oriented markup-business logic binding mechanism. The client runtime environment manages client side code and screen definitions. The server runtime environment dynamical compiles code to ensure client platform compatibility. The system delivers network applications on demand, by separating them into lightweight modules and delivering these modules.

25 Claims, 14 Drawing Sheets

U.S. PATENT DOCUMENTS

| | | | | |
|---|---|---|---|---|
| 6,772,165 | B2 * | 8/2004 | O'Carroll | 707/101 |
| 6,836,883 | B1 * | 12/2004 | Abrams et al. | 717/140 |
| 6,842,894 | B1 * | 1/2005 | Havemose | 717/148 |
| 6,842,906 | B1 * | 1/2005 | Bowman-Amuah | 719/330 |
| 6,886,169 | B2 * | 4/2005 | Wei | 719/316 |
| 6,898,618 | B1 * | 5/2005 | Slaughter et al. | 709/203 |
| 6,918,107 | B2 * | 7/2005 | Lucas et al. | 717/124 |
| 6,950,848 | B1 * | 9/2005 | Yousefi'zadeh | 709/203 |
| 6,968,503 | B1 * | 11/2005 | Chang et al. | 715/526 |
| 6,971,084 | B2 * | 11/2005 | Grey et al. | 717/106 |
| 6,981,250 | B1 * | 12/2005 | Wiltamuth et al. | 717/170 |
| 6,988,263 | B1 * | 1/2006 | Hussain et al. | 717/128 |
| 7,093,243 | B2 * | 8/2006 | Bailey et al. | 717/128 |
| 7,111,282 | B2 * | 9/2006 | Stephenson | 717/130 |
| 7,117,504 | B2 * | 10/2006 | Smith et al. | 719/328 |
| 7,165,239 | B2 * | 1/2007 | Hejlsberg et al. | 717/114 |
| 7,246,146 | B1 * | 7/2007 | Ims et al. | 709/203 |
| 2005/0155027 | A1 * | 7/2005 | Wei | 717/162 |

OTHER PUBLICATIONS

Gyllstrom et al, "The universal compiling system", ACM SIGPLAN, vol. 14, issue 12, pp. 64-70, 1997.*

Debbabi et al, "A dynamic compiler for embaded java virtual machine", ACM PPPJ, pp. 100-106, 2004.*

Nataren et al, "An ECMA script compiler for the .NET framework", IEEE ENC, pp. 235-239, 2005.*

Lattner et al, "LLVM: A compilation framework for lifelong program analaysi and transformation", IEEE GCO, pp. 1-12, 2004.*

Eide et al, "Flick a flexible, optimizing IDL compiler", ACM PLDI, pp. 44-56, 1997.*

Aditya et al, "Compiler directed type reconstruction fro polymorphic languages", ACM FPCA, pp. 74-82, 1993.*

Dmitriev, "Language sepcific make technology fro the Java programming language", ACM OOPSLA, pp. 373-385, 2002.*

HP Invent, "Hp e3000 Solution Transition Advisor — Compilers and user Interfaces", 2002, Hewlett-Packard Company, pp. 1-16.*

Evers, "Sun Launches new XML compiler against Microsoft' C#", Jul. 2000, Network News, Network IT, pp. 1-2.*

Adele Goldberg, Support for Object-oriented programming, in Concepts of Programming Languages, by Robert W. Sebesta, Addison Wesley, p. 435-485.

Adele Goldberg, Support for Object-oriented programming, in Concepts of Programming Languages, by Robert W. Sebesta, Addison Wesley, pp. 435-485.

* cited by examiner

SYSTEM AND METHOD FOR NETWORK-BASED COMPUTING

CROSS REFERENCE TO RELATED CO-PENDING APPLICATIONS

This application claims the benefit of U.S. provisional application Ser. No. 60/439,394 filed on Jan. 10, 2003 and entitled "System and Methods for Automating Code Compilation, Deployment and Execution to Achieve Bandwidth and Client Independent Network Computing" which is commonly assigned and the contents of which are expressly incorporated herein by reference.

FIELD OF THE INVENTION

The present invention relates to a system and a method for network-based computing, and more particularly, to network-based computing that provides network applications that can be automatically deployed, compiled, and executed by any type of a client machine connected to a server via any type of a network connection.

BACKGROUND OF THE INVENTION

A typical computing system includes hardware and software components. Hardware components include computing devices such as personal computers (PC), mainframe computers, and computing circuits, among others. The basic architecture of a computing device includes a central processing unit (CPU), which executes instructions, and a memory unit, which stores instructions and data. Instructions and data are transmitted from the memory unit to the CPU and the results of the CPU operations are sent back to the memory unit. Software components are application programs, which contain the set of instructions that are executed by the CPU unit. Application programs include among others, system programming software, drawing software, word processing software, spreadsheet evaluation software, enterprise resource management software, customer relationship management software, data analysis software, customer self-help software, network and storage management software, mathematical and scientific software. A computer programmer develops an application program by first coding a set of instructions in a source file using the grammar rules of a programming language. In the example of FIG. 1, a programmer writes a source file using the grammar and syntax of the Java™ programming language 82. Next, the Java™ source file passes through a Java™ compiler 84 where it gets analyzed and parsed. The parsed file is then used to generate a Java™ bytecode 86, i.e., a code that is understood by a Java Virtual Machine™ (JVM). The compiled Java™ bytecode file 86 is then stored in the memory of the computing device. When a user wants to run the particular application program the computing device retrieves the compiled Java™ bytecode file 86 from the memory, the Java Virtual Machine™ 88 executes it, and the computing results are displayed 89. The compiled Java™ bytecode file 86 may also be stored in a computer readable storage medium such as a compact disk (CD) or a magnetic floppy disk or tape. These computer readable storage media may also be used to distribute and install the application program, i.e., the compiled Java™ bytecode files, in other computing devices. This computing system is sufficient for independent computing devices.

A network-based computing system includes a central server and a plurality of computing devices, i.e., client machines, that are connected with each and to the server via a network. Application programs are stored in the central server and can be deployed to the client machines via the network. Alternatively, application programs can be installed in the client machines via a manual distribution of computer readable media such as CD or floppy disks containing the compiled application code. Network-based computing is used for large enterprises that have multiple computing devices in multiple locations that interact with each other and with the server via a network connection. An application program in the network-based computing system includes a server program that is stored in the server and a client program that is stored in the memory of a client machine. The server program runs on the server and the client program runs on one of the client machines. Large enterprises utilize network-based computing to run enterprise application such as SAP's Enterprise Resource Planning software and custom internal applications. For example, a financial services company may utilize an internal Investment Portfolio Management application to perform stock analysis. When a portfolio manager wants to do a specific stock analysis, he starts the client program for the Investment Portfolio Management application in the client machine. The client machine loads the multi-megabyte client program, and then receives and processes the portfolio manager's requests. The client machine may also send further requests to the server program via the network to gather any necessary data. Next, the client program receives the necessary data, analyzes the data and presents the result in an appropriate format to the portfolio manager.

Processes associated with network-based computing include application development, application deployment, and application execution, among others. Application development refers to the coding, compiling, and debugging of the server and client programs that can be run by the server and the various configurations and operating systems of the client machines, respectively. Application deployment refers to the distribution and installation of the various client programs in the various client machines. Application execution refers to the execution of the compiled server and client programs by the server and the various client machines of the network, respectively.

The main issues with the application development for a network-based computing system involve around client platform and device configuration incompatibilities. Client platform incompatibilities include different operating systems and different hardware. The operating systems may be various versions of Windows, Mainframe, Macintosh, Unix, Linux, and Palm™. The different hardware may be Pocket PCs, desktops, laptops, workstation, phone systems, personal digital assistants (PDA) and smart television sets. Device configuration includes the specific settings that a given application may require, such as the Dynamic Link Library (DLL) version and registry for typical Windows applications. For companies with thousands of users and client machines, client platform and device configuration incompatibilities result in a significant amount of complexity and increased costs for the development of network applications.

The main issues with the application deployment in a network-based system involve around the distribution of the client program to thousands or even hundreds of thousands of client machines and the confirmation that each client machine always contains the most appropriate version of the application. The following approaches are the most commonly used today for handling code distribution and configuration:

a) CD/Floppy disk distribution and manual installation and configuration: Information System (IS) personnel install the compiled client program from a CD or floppy disks directly onto the client computer and manually configure the application for each client computer. This manual process is repeated every time the code is upgraded. Considering that an enterprise can have thousands of desktop computers distributed in many different offices, this approach is very inefficient, time consuming and costly.

b) Manual network download, installation and configuration: This approach enables an end user to download and install the client program into his computer over a Local Area Network (LAN), a Wide Area Network (WAN) or the Internet. However, considering that the client program can be easily tens of mega bytes, downloading such a big file and configuring the application can take each user up to several hours to achieve. Considering an enterprise that has thousands of users, the amount of productivity loss due to this manual downloading process can be significant. Furthermore, in cases where the network connection is slow and has limited bandwidth (i.e., dialup or wireless connection), this is simply not a viable option.

The issue with the client program execution is that the current program execution model requires loading almost the entire program into memory before the user is able to run the application. As was mentioned above, client programs are typically multi-megabyte files and loading such big files into memory creates lengthy delays for users. Further, this execution model creates increasing demands on hardware because it requires faster CPU, bigger memory, more storage, and a faster network, all of which translate into costs and performance issues.

Alternative approaches to this static network-based computing system include the Java™ Applet approach and the Hyper Text Markup Language (HTML) web page approach. In the Java™ Applet approach the client component of a network application is written as a Java™ Applet, and the end users can access this application without the need to install it in advance. However, Java™ Applets have severe technical limitations that restrict its practical use to simple application only. For complex enterprise applications, the Java™ Applet not only performs poorly but also can easily have a footprint in excess of 1MB, which requires lengthy downloading which in turn effectively prevents users from using it over the Internet or WAN. In addition, Java™ Applets require a Java Virtual Machine™ (JVM) on the client machine. The JVM™ incompatibilities and lack of JVM™ on some machines both add to the failure of wide adoption of Java™ Applets for enterprise applications.

In the HTML web page approach companies use HTML for publishing simple application screens. In this approach, the entire application is running on the server. Each screen is formatted into an HTML web page and displayed in a web browser. Some simple client-side logic can be added to the HTML page using technologies, such as JavaScript™. However, this approach is limited to applications that require minimal user interactivity and functionality. Network applications using this approach sacrifice many of the features and functionality associated with client-side computing, such as offline computing, drag&drop, multiple windows, spreadsheet behavior, among others. The "click and refresh" user interaction model associated with web browsing is not suitable for network applications because this model not only consumes significant bandwidth by sending and re-sending redundant information, but it also significantly lowers user productivity by keeping users waiting with every mouse click. In this scenario, the client-side business logic is also limited because a scripting language, such as JavaScript™, does not scale well to a large team of developers, unlike the more robust Object-oriented programming (OOP) languages like Java™ and C++. As a result, HTML is used only for simple application. Important applications are still being written as traditional Client/Server applications using OOP languages.

In summary, the current approaches for network-based computing are costly, inefficient and complicated for developers. In order to use an application, users have to go through a lengthy downloading, configuration and loading process. Whenever a new version of the application is available, users have to go through the same process again. Platform incompatibilities often prevent many users from being able to run the application at all. Companies often have to maintain a significant technical support team to manage and deal with application configuration and management. Desktops need to be constantly upgraded to keep up demands from bigger and bigger client programs. For users that are distributed over a wide area network (WAN) or even the general public Internet, where bandwidth is very limited, the current approaches are simply not viable options. Though there are alternative approaches, like HTML, which can significantly lower the client footprint and reduce the client incompatibility problem, such approaches are not able to deliver the functionality and performance required for most business applications.

Accordingly, there is a need for a network-based computing system that automates, simplifies, and optimizes the compilation, deployment, and execution of an application by any type of a client machine connected to a server via any type of a network connection.

SUMMARY OF THE INVENTION

In general, in one aspect, the invention features a universal compiler that receives a plurality of input files having a source code of an application written in anyone of a plurality of different programming languages, respectively, and convert any of the input files into an output file having an executable code of the application that is executable by an execution engine.

Implementations of this aspect of the invention may include one or more of the following features. The universal compiler may include a plurality of specific programming language compilers. Each of the specific programming language compilers receives an input file having the source code of the application written in the specific programming language and converts the input file into a specific executable code of the application that is executable by a specific execution engine. The universal compiler may further include a control logic for selecting a specific programming language compiler from the plurality of specific programming language compilers. The programming languages may be Java™, JavaScript™, C#, C+, C++, Visual Basic™, J#, ActionScript, XSL, XQuery, or XPath, among others. The executable code may be a Java Virtual Machine™ bytecode, a .NET Common Language Runtime (CLR) bytecode, or a Flash player bytecode, and the execution engine may be a Java Virtual Machine™, a .NET CLR engine or a Flash player, respectively.

In general, in another aspect, the invention features a compiler system adapted to receive a plurality of input files, and convert any of the plurality of input files into a plurality of output files. Each of the input files includes a source code of an application written in anyone of a plurality of different programming languages and the plurality of output files include a plurality of executable codes of the application, respectively, that are executable by a plurality of execution engines, respectively.

Implementations of this aspect of the invention may include one or more of the following features. The compiler system may include a plurality of universal compilers, and each universal compiler may include a plurality of specific programming language compilers. Each of the specific programming language compilers is adapted to receive an input file having the source code of the application written in the specific programming language and to convert the input file into a specific executable code of the application that is executable by a specific execution engine. The compiler system may further include a first control logic for selecting a universal programming language compiler from the plurality of universal programming language compilers and a second control logic for caching the plurality of executable codes. The programming languages may be Java™, JavaScript™, C#, C+, C++, Visual Basic#, ActionScript, XSL, XQuery, and XPath™, among others. The executable codes may be a Java Virtual Machine™ bytecode, a .NET CLR bytecode, a Flash player bytecode, a Palm™ OS bytecode, Symbian OS™ bytecode, and Qualcomm Brew bytecode, and said corresponding execution engines may be a Java Virtual Machine™, a .NET CLR engine, a Flash player, Palm™ OS, Symbian OS™, and Qualcomm Brew engine, respectively.

In general in another aspect, the invention features a distributed computing system including a server having a universal compiler and at least one client machine having an execution engine and connecting to the server via a network. The universal compiler is adapted to receive a plurality of input files and convert any of the input files into an output file. The plurality of input files comprise a source code of an application written in a plurality of programming languages, respectively, and the output file comprises an executable code of the application. The execution engine is adapted to receive the output file over the network and execute the executable code.

In general in another aspect, the invention features a distributed computing system including a server having a compiler system and a plurality of client machines having a plurality of execution engines, respectively, and connecting to the server via a network. The compiler system is adapted to receive a plurality of input files and convert any of the input files into a plurality of output files. The plurality of input files comprise a source code of an application written in a plurality of different programming languages, respectively, and the plurality of output files comprise a plurality of executable codes of the application, respectively. The execution engines are adapted to receive the output files over the network and execute the corresponding executable codes.

In general in another aspect, the invention features a universal XML compiler adapted to receive a plurality of input files, and convert any of the plurality of input files into an output file. The plurality of input files comprise a plurality of markup documents written in a plurality of different XML languages, respectively, and the output file comprises an executable code that is executable by a certain execution engine.

Implementations of this aspect of the invention may include one or more of the following features. The XML languages may be XML, XUL, SVG, Xforms, XAML, HTML, XHTML™, HTML related languages, or combinations thereof. The executable code may comprise an XML language format and the certain execution engine may comprise an XML execution engine. The executable code may have a binary format and the certain execution engine may be an engine that executes this binary format. The binary format may be Java Virtual Machine™ bytecode, .NET CLR bytecode, Palm™ OS bytecode, Flash player bytecode, Symbian OS™ bytecode, or Qualcomm Brew bytecode, and the execution engine may be a Java Virtual Machine™, a .NET CLR, a Palm™ OS, a Flash player, a Symbian OS™, or a Qualcomm Brew, respectively.

In general, in another aspect, the invention features a method of deploying an application in a network computing system that includes a server and one or more client machines that connect to the server via a network connection and each has an execution engine. The method includes sending a request by one of the client machines to the server to download one or more files of the application. Next, receiving the request by the server, and characterizing the client machine's execution engine. Next, checking if one or more executable codes of the one or more files of the application code, respectively, are already available in a server storage. The one or more executable codes are executable by the client machine's execution engine. Finally, if the one or more executable codes are available, downloading them to the client machine.

Implementations of this aspect of the invention may include one or more of the following features. The downloaded one or more executable codes may be cached in a client machine storage. The one or more executable codes may also be downloaded from the client machine storage. If the one or more executable codes are not available in the server storage the method includes compiling the one or more files of the application into the one or more executable codes, respectively, and then downloading them to the client machine.

In general, in another aspect, the invention features a computer application program including at least one markup document, at least one business logic component associated with the at least one markup document and an object oriented binding mechanism binding the at least one markup document to the at least business logic component and the reverse.

Implementations of this aspect of the invention may include one or more of the following features. A client runtime environment (CRE) may receive and convert the at least one markup document into an object-oriented representation. The object-oriented representation may include one or more markup objects, one or more user interfaces, and one or more data sets. The at least one business logic component may include one or more methods used as event handlers for a markup object event. The object oriented binding mechanism may include invoking the one or more methods by the one or more markup objects by firing a markup object event. The object oriented binding mechanism may further include accessing and modifying the one or more markup objects by the at least one business logic component via an Application Program Interface (API). The API may be a markup object API or a Document Object Model (DOM) API. The one or more markup objects may include a parent markup object and a child markup object and the child markup object may have one or more markup object properties inherited from the parent markup object. The one or more markup object properties may be a user interface definition, a data set definition or an event handler definition. The parent markup object may have one or more user interface definitions, one or more data definitions and one or more event handlers and the child markup object may inherit the one or more user interface definitions, the one or more data definitions and the one or more event handlers from the parent markup object. The one or more markup objects may include a parent markup object and a child markup object and the child markup object may overwrite one or more markup object properties of the parent markup object and replace them with one or more markup object properties of the child markup object. The at least one markup document may be written in a markup language including among others, XML, XUL, SVG, Xforms, XAML, HTML, HTML related languages, text, or combinations thereof. The one or more business logic components may be written in a programming language including among others, Java™, JavaScript™, J#, C#, C+, C++, Visual Basic™, ActionScript, XSL, XQuery, or XPath.

In general, in another aspect, the invention features a network application program having one or more modules wherein each module includes at least one markup document, at least one business logic associate with the at least one markup document and an object oriented binding mechanism binding the at least one markup document to the at least business logic component and the reverse.

In general, in another aspect, the invention features a network computing system including a server having a server runtime environment (SRE) and a network application program, and one or more client machines, each client machine including a client runtime environment (CRE) and being adapted to connect to the server via a network connection. The SRE deploys the network application program to the one or more client machines via the network connection by first separating the network application into one or more modules and then downloading separately each of the one or more modules to the one or more client machines. Each module includes at least one markup document.

Implementations of this aspect of the invention may include one or more of the following features. The network computing system may further include at least one business logic associate with the at least one markup document and an object oriented binding mechanism binding the at least one markup document to the at least business logic component and the reverse. The CRE may include a storage for storing the downloaded one or more modules. The CRE may execute the downloaded one or more modules of the network application program independently of each other. The CRE may also execute the downloaded one or more modules of the network application program offline. The server may include a compiler system adapted to receive a plurality of input files, and convert any of the plurality of input files into a plurality of output files, respectively. The plurality of input files may include the network application written in a plurality of different programming languages, respectively, and the plurality of output files may include a plurality of corresponding executable codes of the network application, respectively. Each of the one or more client machines may have an execution engine adapted to receive one of the output files and execute the corresponding executable code. The network connection may have low bandwidth.

In general in another aspect the invention features a method for performing computing in a network computing system comprising a server and one or more client machine adapted to be connected to the sever via a network connection. The method includes separating a network application stored in a server storage into one or more modules, wherein each module includes at least one markup document. Next, placing a request by a user through one of the one or more client machines to download one of the one or more modules. Next, checking by a CRE of the client machine if the one module is available in a storage of the client machine, and if it is available downloading and executing the module.

Implementations of this aspect of the invention may include one or more of the following features. The module may further include at least one business logic associate with the at least one markup document and an object oriented binding mechanism binding the at least one markup document to the at least business logic component and the reverse. The method may further include the following. If the module is not available in a storage of said client machine sending a request to the server to download the module. Next, receiving the request by the server, and characterizing the client machine's execution engine. Next, checking if an executable code file of the module that is executable by the client machine's execution engine is already available in a server storage, and if the executable code file is available, downloading the executable code file to the client machine. The method may further include caching the downloaded executable code file in a client machine storage and executing the module by the client machine. If the executable code file is not available in the server storage compiling the module into the executable code file and then downloading the executable code file to the client machine In general, in another aspect, the invention features a method of handling a client event in a computer application program comprising a client-side component running in a client machine and a server-side component running in a server, wherein the client machine is adapted to connect to the server via a network connection. The method includes checking if there is a listener listening to the event and determining if the listener is located in the client-side component or the server-side component. If the listener is located in the client-side component, instantiating the listener and invoking a registered listener method to process the event, thereby producing a result. Next, checking if the result is a markup document or a direct client Document Object Model (DOM) Application Program Interface (API) manipulation, and if the result is a markup document displaying the markup document.

Implementations of this aspect of the invention may include one or more of the following features. If the result is a direct client DOM API manipulation, the method further includes executing API calls and displaying the result. If the listener is located in the server-side component, the method further includes sending the event to the server to process the event and invoking a server-side handler for processing the event thereby producing a server result. Next, sending the server result to the client machine and displaying the server result.

In general, in another aspect, the invention features a method of binding a markup document with one or more business logic objects including coding the markup document using a markup language, coding the one or more business logic objects using an object oriented programming language and associating the markup document with the one or more business logic objects. Next, constructing an object oriented representation of the markup document thereby generating one or more markup objects. Next, firing one or more markup object events by the object oriented representation thereby invoking the one or more business logic objects for processing the events and finally manipulating the markup objects by the one or more business logic objects. The business logic objects may manipulate the markup objects via a markup object API or a Document Object Model (DOM) API.

Among the advantages of this invention may be one or more of the following. The computing system enables partitioned delivery and execution of a network application from a central server to any client machine connected to the server via a network connection. The network connection may be a low bandwidth network. The client machines may include any type of computing platforms and devices. The network application includes markup documents, business logic components and an object-oriented binding mechanism binding the markup documents to the business logic components and the reverse. The markup documents may be scripted using any type of a markup language including among others, XML, XUL, SVG, Xforms, XML related languages, HTML, HTML related languages, text, and combinations thereof.

The business logic components may include source code scripted in any programming language including among others, Java™, JavaScript™, J#, C#, C+, C++, Visual Basic™, ActionScript, XSL, XQuery, and XPath. A compiler system converts the source code to any type of executable bytecode. This compiler system configuration provides flexibility in both the programming side of the application and the execution side of the application.

The details of one or more embodiments of the invention are set forth in the accompanying drawings and description below. Other features, objects and advantages of the invention will be apparent from the following description of the preferred embodiments, the drawings and from the claims.

DETAILED DESCRIPTION OF THE INVENTION

Figure 1:
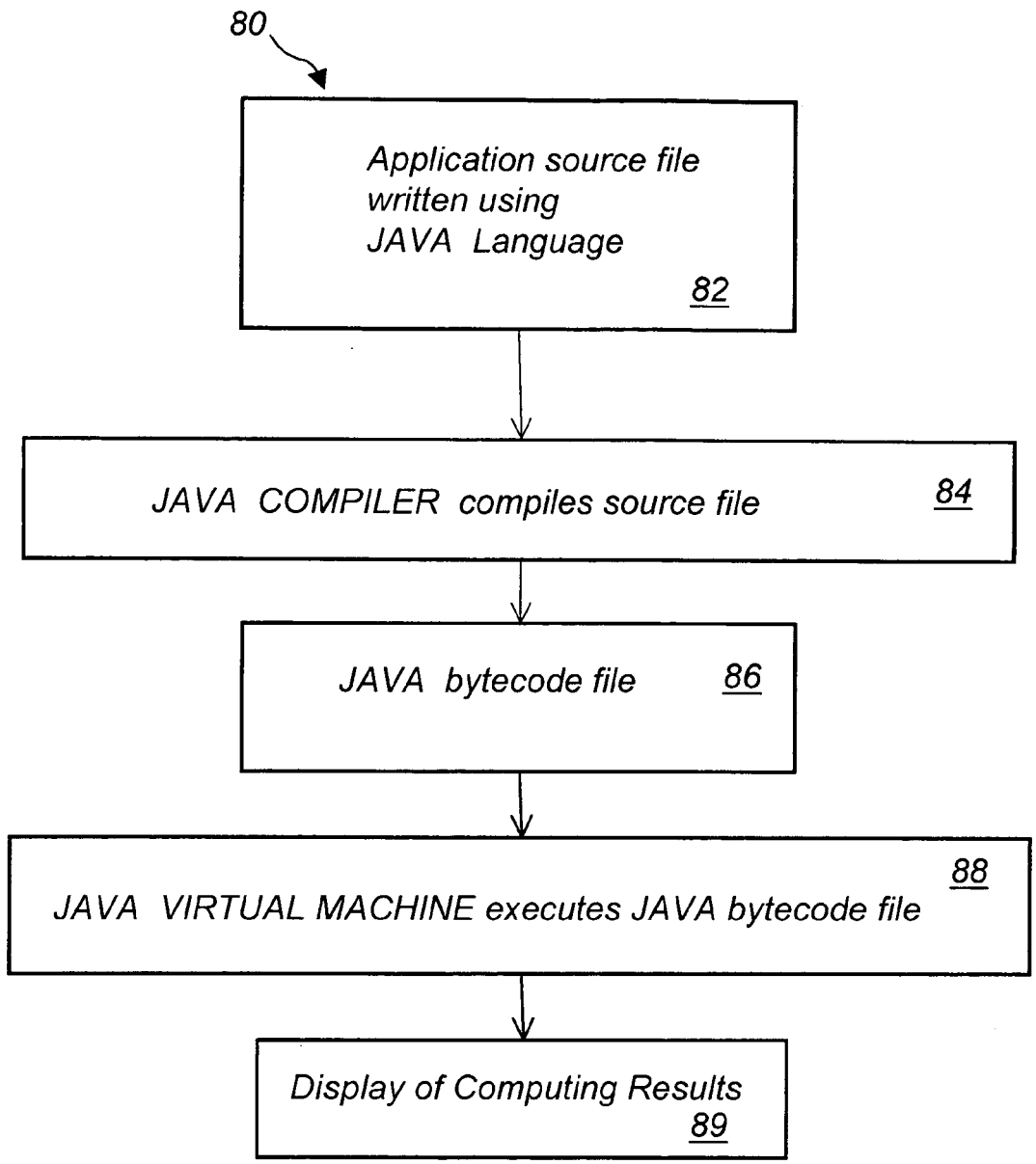
FIG. 1 is a block diagram of a prior art process for writing, compiling and executing of an application.
Figure 2:
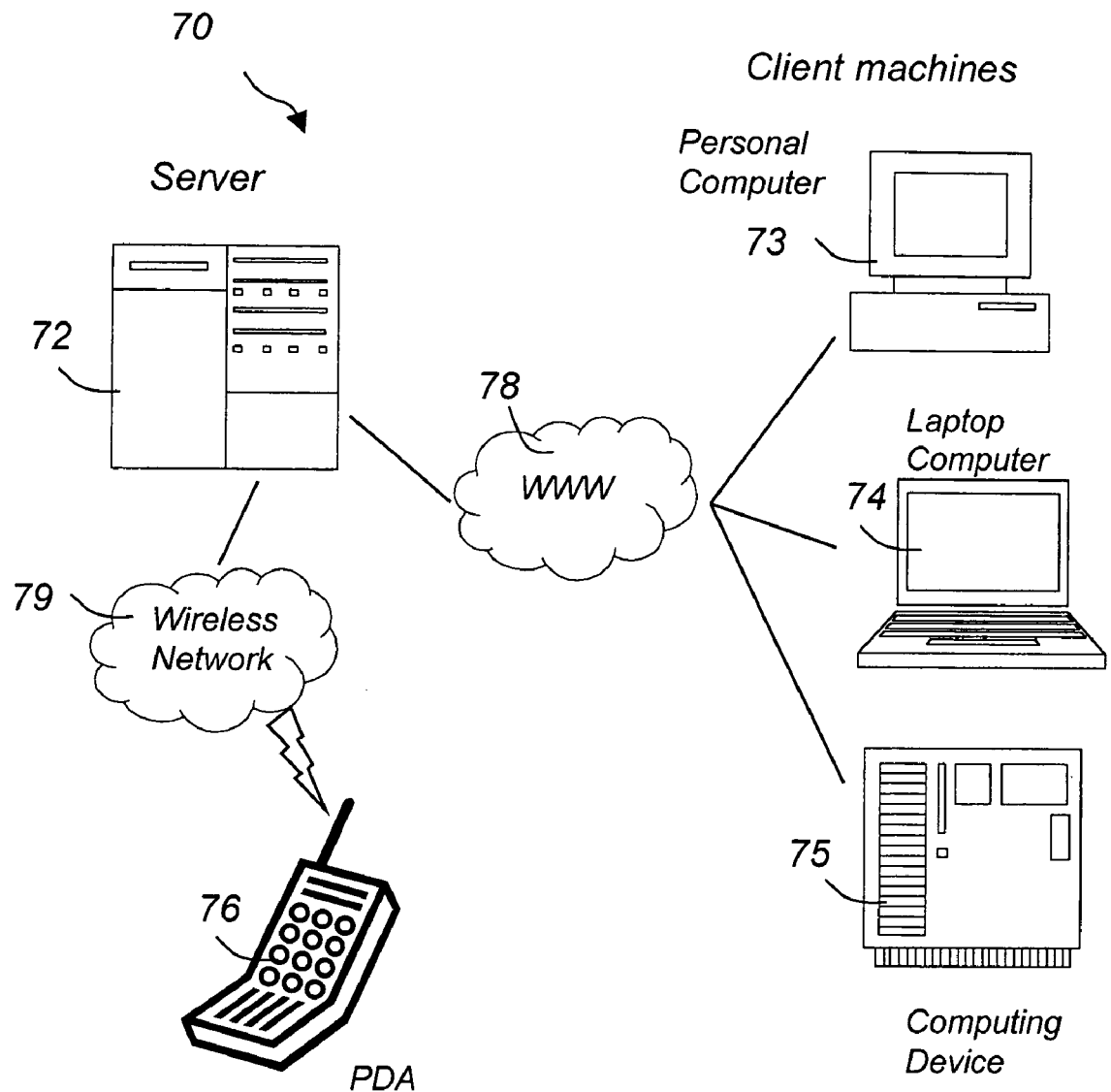
FIG. 2 is an example of a network-based computing system.

Referring to FIG. 2, a network-based computing system 70 includes a server 72 and client machines 73, 74, 75, and 76. The client machines include a personal computer 73, a laptop computer 74, other computing devices 75, and a wireless communication device 76. Client machines 73, 74 and 75 are connected to the server 72 via a network connection 78. Client machine 76 is connected to the server 72 via a wireless network connection 79. There may be several additional client machines including personal computers, laptop computers, Linux machines, workstations, computing circuits, and wired communications devices, such as telephone and television. Network connection 78 may be the Internet, the World Wide Web (WWW), a Wide Area Network (WAN), a Local Area Network (LAN), a Personal Area Network (PAN) or a telecommunication network. The wireless communication device 76 may be a mobile phone, a personal digital assistant (PDA), a pager, a wireless laptop computer, a personal computer, a television, and programmable versions thereof or combinations thereof. The wireless network 79 may be a wireless wide area network (WWAN), a wireless local area network (WLAN), a wireless personal area network (WPAN) or a private communication network.

Figure 3:
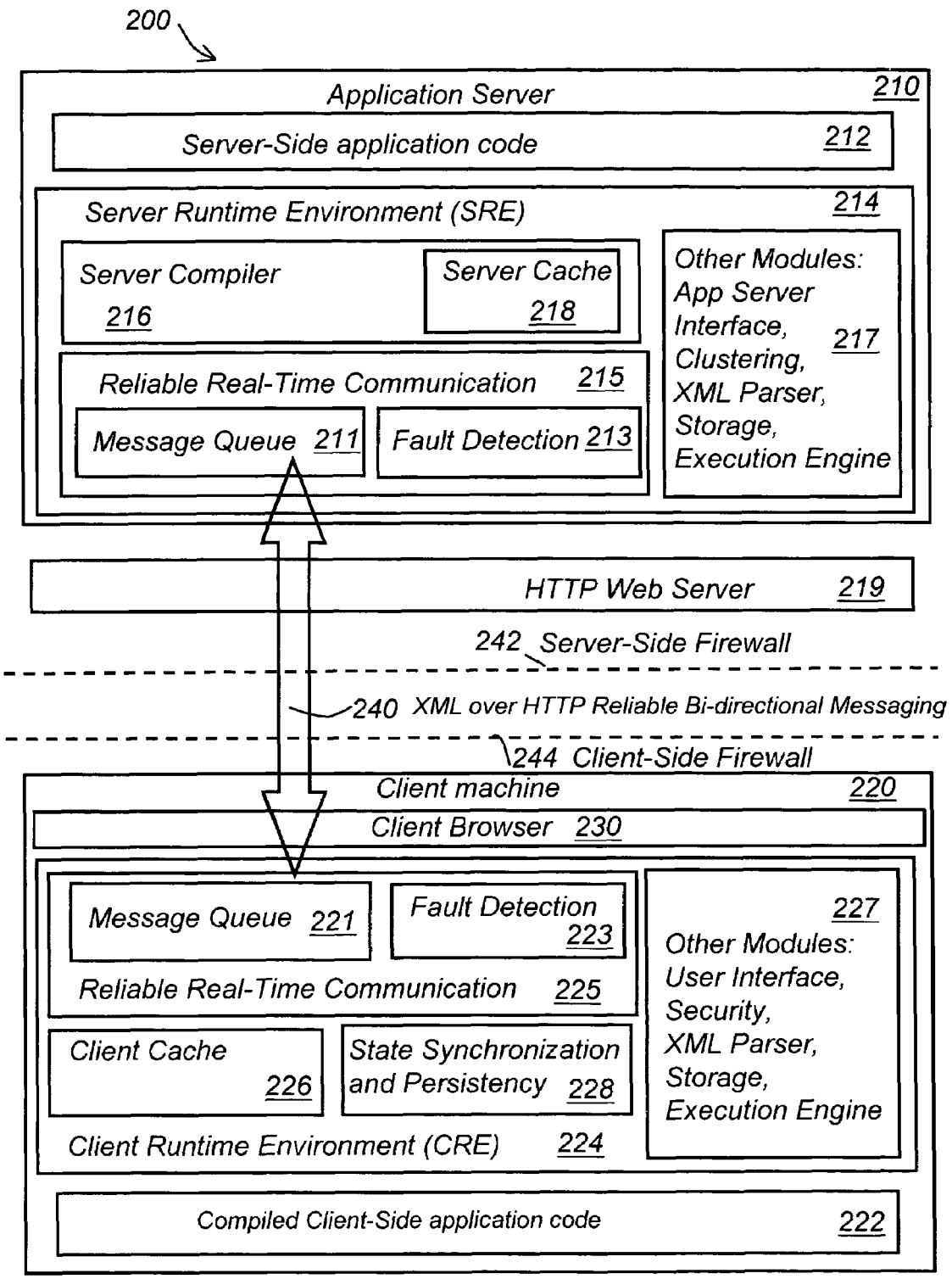
FIG. 3 is a block diagram of the software and hardware components of a simple network-based computing system.

Referring to FIG. 3. a block diagram of the software and hardware components of a simple network computing system 200 includes an application server 210, a client machine 220, and a web server 219. The application server 210 runs behind the web server 219, and runs server-side application code (or server-side business logic) 212. The web server 219 delivers markup documents or electronic messages generated by the server side application code 212 to a client web browser 230 residing inside the client machine 220. Electronic messages are communication messages delivered electronically for information exchange. Markup documents are electronic documents, i.e., files, written using a markup language such as XML or HTML. A markup language is a conventional language for describing the contents of an electronic document that is to be viewed or printed on a computer output device such as a computer monitor. A markup language document can contain text, images, JavaScript™, and hyperlinks, among others. A real time, bidirectional, reliable messaging system 240 transmits messages between the client web browser 230 and the web server 219 over an HTTP web connection. The application server includes in addition to the server side application code 212 a Server Runtime Environment (SRE) 214. The SRE 214 runs behind the HTTP web server 219 and inside the application server 210. The SRE 214 includes a server compiler 216, a server cache 218, a communications module 215, and other functional modules 217. The functional modules 217 include an Application Server Interface, an XML Parser, Clustering, Storage, and an Execution Engine. The application server interface module enables the SRE 214 to run inside the application server 210 and enables applications inside the application server 210 to access the SRE's functionalities. The XML Parser module is responsible for parsing XML documents that come from the various client machines or other information sources such as other backend connections. The parsing results may be stored in the Storage module. The clustering module provides support for clustering the SRE and the execution engine module executes the compiled server-side application code 212.

The client machine 220 includes a client runtime environment (CRE) 224 that runs outside the client web browser 230 and client-side application code 222 (or client-side business logic). In other embodiments the CRE runs inside the client web browser 230. The client side application code 222 includes Extensible Markup Language (XML) documents and procedural code. The client machine 220 is protected by a client side firewall 244 and the web server 219 is protected by a server side firewall 242. The CRE 224 processes markup documents and executes the client-side application code 222. The CRE 224 includes a client cache 226, a communication module 225, a state synchronization and persistency module 228 and other functional modules 227 such as an XML parser, a user interface, storage, security, and an execution engine. The XML Parser is responsible for parsing XML documents that come from the application server 210. The parsing results may be stored in the client cache 226 as part of the application's client side state. The user interface module is responsible for displaying the user interface and interacting with the user according to the application's XML description. The execution engine module is capable of running client side application code 222. The client cache 226 maintains the application's client side state and is updated by the CRE automatically. The synchronization and persistency module 228 is responsible for synchronizing the client cache 226 with the application server 210, and saving and/or retrieving the client cache 226 from persistent storage.

The CRE 224 is centrally managed by the SRE 214. The CRE 224 is automatically downloaded from the application server 210 and installed in the client machine 220 the first time a user access a client application. After the initial installation, the SRE 214 automatically manages the versioning and updating of the CRE 224. Different CREs 224 are used for the different client platforms. For example, different CREs are used for a Java Virtual Machine™, a NET CLR, or a Flash Player. The executable application code formats of these three client platforms are: Java™ bytecode, .NET CLR bytecode and Flash bytecode, respectively. The application code 222 is delivered in three different executable code formats for these three client platforms, accordingly.

Figure 4:
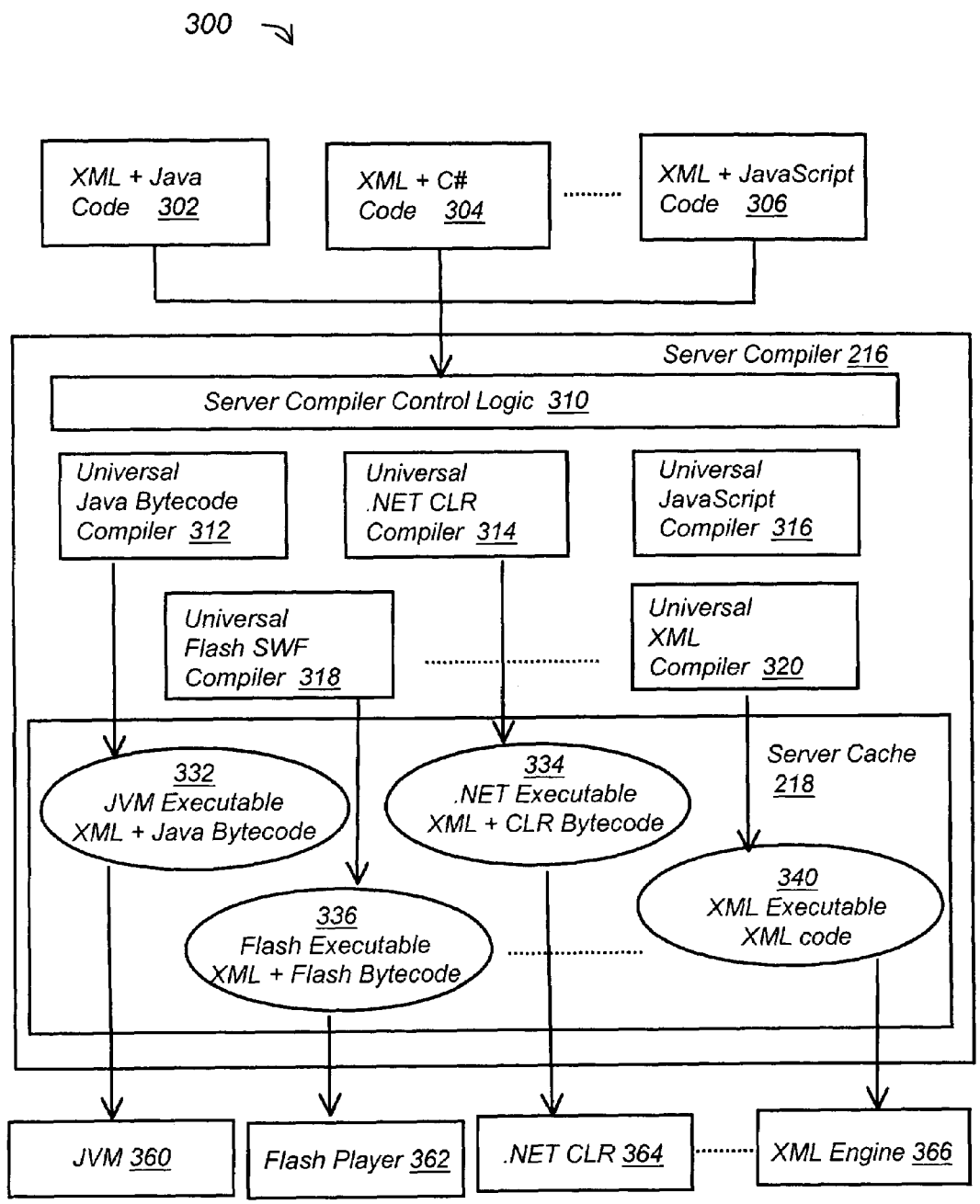
FIG. 4 is a schematic diagram of the server compiler of the application server of FIG. 3.

Referring to FIG. 4, the server compiler 216 is a software program that translates source code written in any supported programming language into executable code of any supported executable format. As shown in FIG.4, the source code is written in a programming language, such as Java™, C#, JavaScript™, and XML, among others. The supported executable formats are Java™ bytecode, .NET CLR bytecode, or Flash bytecode, among others, depending on the client platform. For example, when the client platform is running a Java Virtual Machine™ 360, all input source files, no matter which language they are being written in, are compiled into Java™ bytecode executable files by the server compiler 216. Similarly, if the client platform is running a .NET CLR, all source code files are compiled into .NET CLR bytecode.

The server compiler 216 includes a plurality of specific universal compilers including among others, a universal Java™ Bytecode compiler 312, a universal .NET CLR (Common Language Runtime) compiler 314, a universal JavaScript™ compiler 316, a universal Flash SWF compiler 318, and a universal XML compiler 320. The server compiler 216 also includes a server compiler control logic 310 that detects the type of the client platform, invokes compiling and caching of a client platform appropriate executable code and delivers the appropriate executable code to the corresponding client platform. When the server compiler 216 receives a request from a certain client machine, the control logic 310 first characterizes the client machine to see which executable format is supported by this client machine. If a compiled executable code of the supported format is available in the server cache 218 and the source file has not changed since last compilation, the server compiler control logic 310 sends the cached executable code to the client machine directly. If the source file has been changed since the last compilation, the control logic 310 prompts the server compiler 216 to retrieve the source file, compile the source file into the appropriate executable code, cache the executable code in the server cache 218 and send the executable code to the client machine.

Each universal compiler receives an input file written in any programming language, such as Java™, C#, JavaScript™, C+, C++, Visual Basic™, and delivers an output file in one executable format specific to a certain client platform. The input files 302, 304, 306 and the output files 332, 334, 336, 340 may also include markup documents written in XML.

Figure 4A:
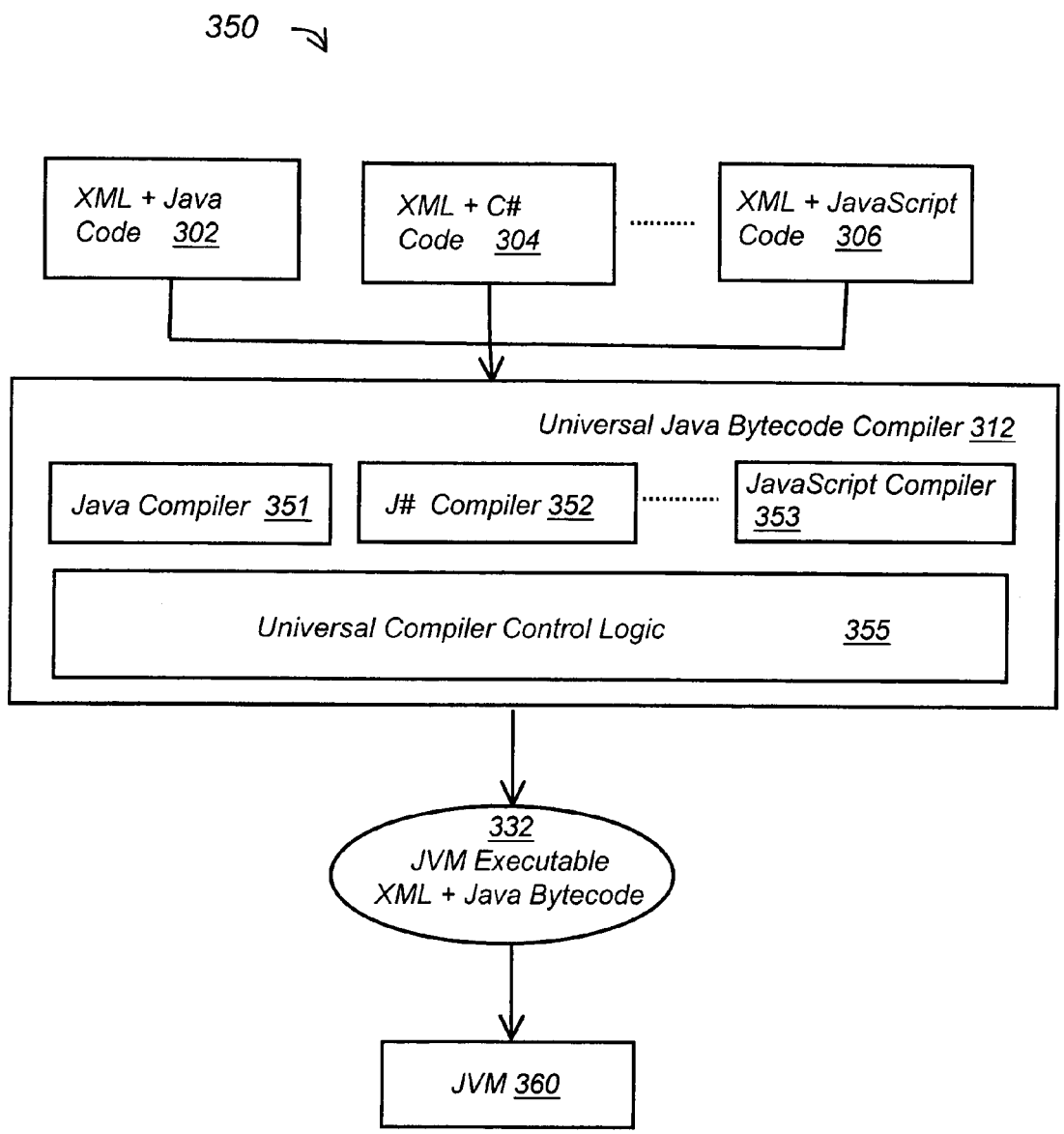
FIG. 4A is a detailed block diagram of the universal Java bytecode compiler of FIG. 4.

Referring to the example of FIG. 4A, the universal Java™ bytecode compiler 312 receives source code files written in programming languages such as Java™ 302, C# 304, JavaScript™ 306, among others, and delivers a Java Virtual Machine™ executable Java™ bytecode file 332. The universal Java™ bytecode compiler 312 includes a plurality of custom developed language compilers, such as JavaScript™ compiler 353, a plurality of commercially available language specific compilers, such as Java™ compiler 351, J# compiler 352, C# compiler, among others, and a control logic 355. Java™ compiler 351 is commercially available from Sun Microsystems of Santa Clara, Calif., J# compiler 352 is commercially available from Microsoft of Redmond Wash. The JavaScript™ compiler 353 is custom developed by Nexaweb and compiles JavaScript™ files into Java™ bytecode. Similarly, the universal .NET CLR compiler 314, the universal JavaScript™ compiler 316, and the universal Flash SWF compiler 318, receive input files written in any programming language and deliver bytecode files executable by a .NET CLR engine, a JavaScript™ engine, and a Flash player, respectively. The control logic 355 module includes rules for handling the various programming language codes and processes the input files. When an input file is received, control logic module 355 checks which language the source code file is being written in and selects the appropriate language specific compiler to compile the source code file into executable code in the desired executable format. For example, control logic 355 of the Universal Java™ bytecode compiler 312 would select the JavaScript™ compiler 353 to compile JavaScript™ source files and Java™ compiler 351 to compile Java™ source files.

Figure 4B:
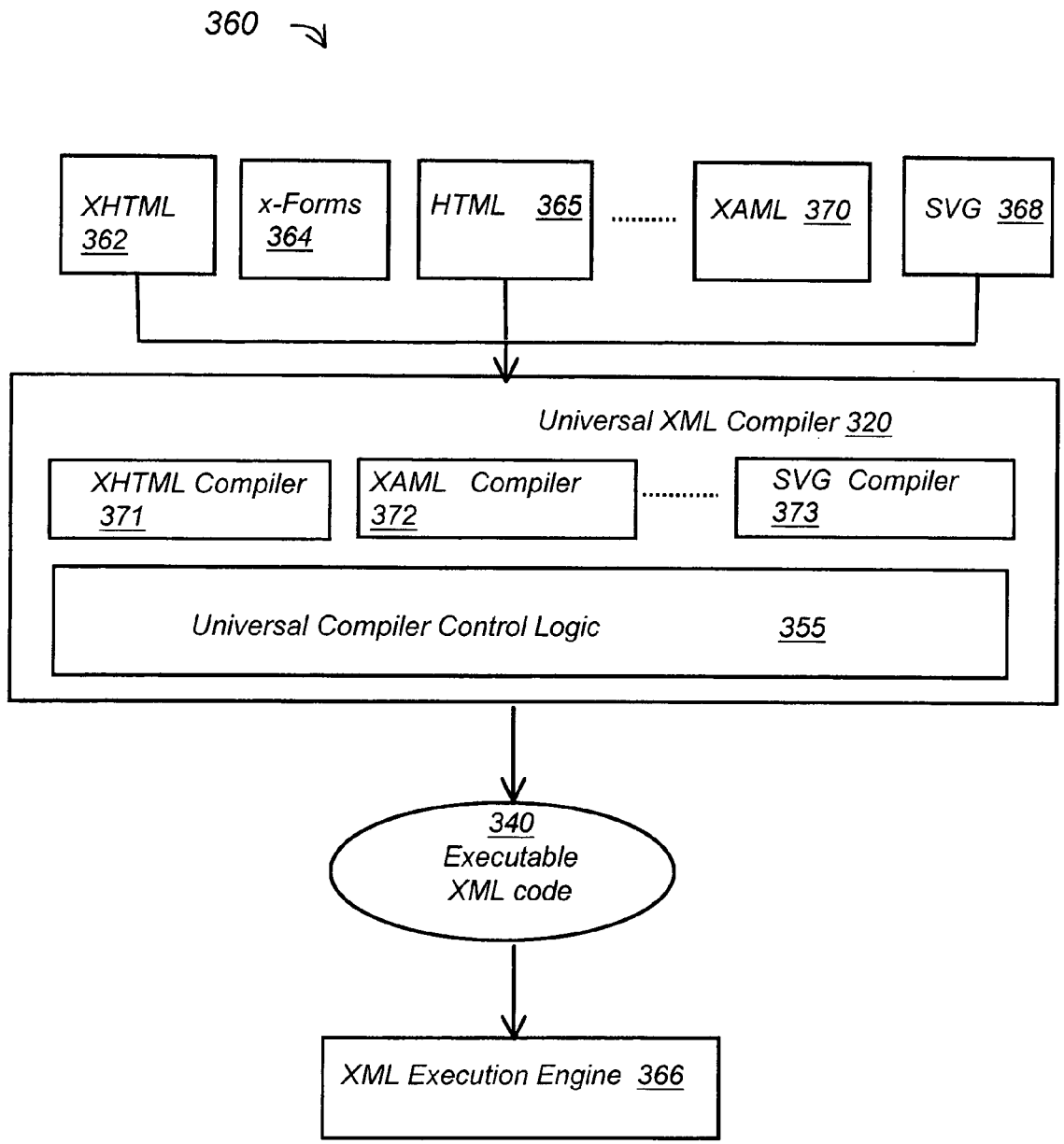
FIG. 4B is a detailed block diagram of the universal XML compiler of FIG. 4.

Referring to FIG. 4B, the universal XML compiler 320 receives files written using various markup languages such as, XHTML™ (362), x-Forms (364), HTML (365), XAML (370), SVG (368), and delivers XML code (340) executable by an XML execution engine (366). The universal XML compiler 320 includes a plurality of markup language specific compilers, such as XHTML™ compiler 371, XAML compiler 372, SVG compiler 373, among others, and a control logic 355. The control logic 355 is responsible for selecting and invoking a markup language specific compiler to compile a source file written in the specific markup language. The language specific compiler takes the markup document and converts it into a new markup document in the executable format required by the execution engine. For example, if the execution engine is a SVG rendering engine that knows how to render SVG and the source code file is written using XAML, the XAML compiler takes the XAML input and converts it into SVG format. This compilation process can be achieved using an XML Stylesheet Transformation (XSLT), or some other lexical analysis and transformation.

The compiled bytecode files 332, 334, 336, 340 may be stored in the server cache 218, shown in FIG. 4. When the CRE 224 of a client machine 220 requests a specific file, the SRE 214 determines the particular executable format of the CRE 224 and checks if this particular format has already been compiled and is stored in the server cache 218. If the particular compiled bytecode exist in the server cache 218 and the code has not been modified since the last time it was compiled the SRE 214 downloads the executable file to the CRE 220 an stores it in the client cache 226. Otherwise, the SRE 214 will invoke the server compiler 216, and first compile the requested code in the particular executable format and then download it to the CRE 224 and store it in the client cache 226.

This invention utilizes object-oriented programming methodology to develop object-oriented application programs. Object-oriented application programs typically model a problem using an "object model" that defines classes of objects representing elements of the problem. A class of objects is defined in terms of the relationship of the class to other classes, the data and properties (or attributes) associated with objects in the class, and the operations (or tasks) that can be performed on objects in the class. During execution of an object-oriented application program, instances of the classes in the object model, referred to as "objects," are produced and manipulated. Computation on these "objects" is performed by calling on "methods" defined in business logic components associated with these "objects". For example, in an accounting management program, the various accounts are defined as the program objects. Each object, i.e., account, has attributes including account name, account number, amount deposited in the account, among others. Tasks associated with these account objects may be "get account number", "set account name", "set account amount", among others. Objects interact with each other and with the business logic code via events or messages. An object may fire an event (or send a message) in order to modify its own properties, or state. Events are received and processed by the subprograms or business logic components associated with these objects. Object-oriented programming languages are well known in the art and are described in "Programming languages" Chapter 11, p 435–483, edited by Robert W. Sebesta.

Figure 5:
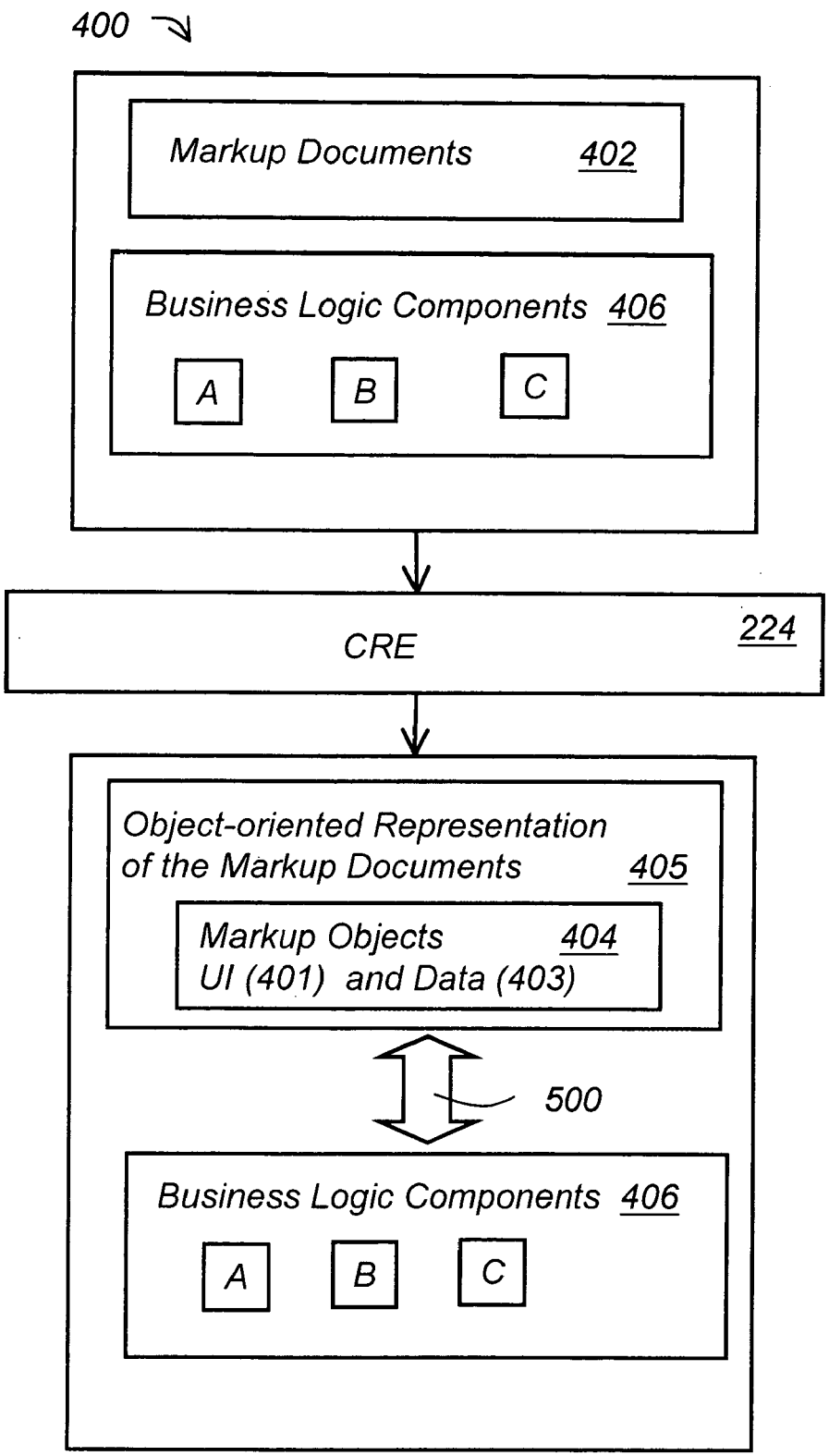
FIG. 5 is a block diagram of an object-oriented application according to this invention.

Referring to FIG. 5, the object-oriented application code 400 includes one or more markup documents 402 and one or more business logic components 406. The markup documents 402 are files written using an XML markup language. The business logic components 406 include instructions for performing tasks upon the program objects. These instructions are formulated as source code files written in a programming language, such as Java™, JavaScript™, C#, Visual Basic™ J#, among others. The business logic components 406 are also program objects. The Client Runtime Environment (CRE) 224 receives the markup documents 402 and converts them into object-oriented representations, i.e., markup objects 404. The markup objects 404 may be user interfaces (UI) 401 or data 403. Each markup object 404 may have events associated with it. For example, in the case of a UI markup object that has input fields or buttons, an event may include highlighting the button or input field, entering text in the field, or clicking the button, among others. The event is received and processed by the business logic component, so that the state of the abject is modified. In the example of the user interface with the input fields, where text is entered in the input fields, the business logic component modifies the UI to display the entered text. The object oriented representations of the markup documents 405 and business logic components 406 are bound via a markup-business logic binding mechanism 500.

Figure 6:
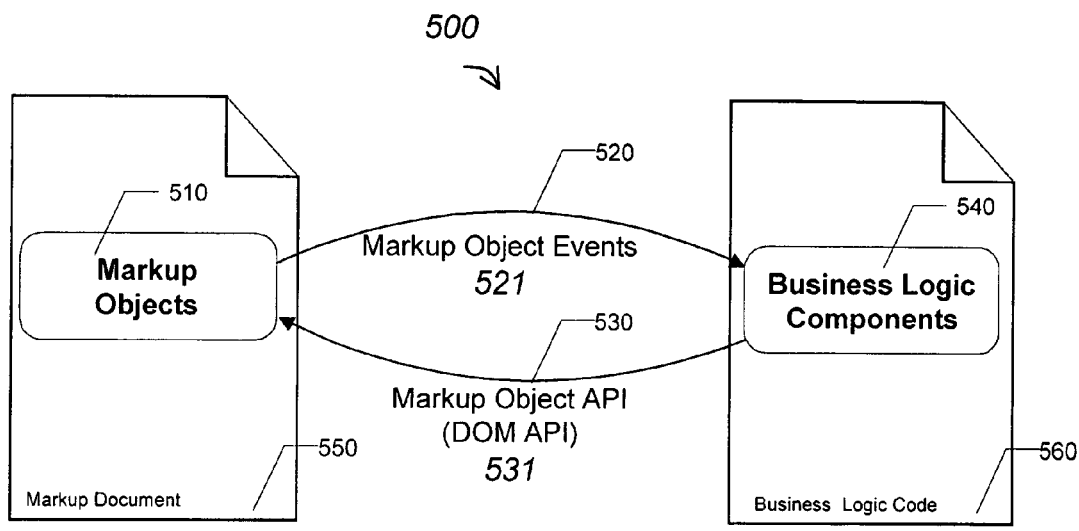
FIG. 6 is a schematic diagram of the markup-business logic binding mechanism of this invention.

Referring to FIG. 6, the markup-business logic binding 500 includes the process of binding the markup objects to the business logic components (520) and the process of binding the business logic components to the markup objects (530). In the markup object to business logic component binding 520, markup objects 510 defined in markup document 550 invoke business logic components 540 by firing markup object events 521. The business logic components 540, include definitions of methods that are used as the event handlers for the markup object events. Upon firing of an event, the CRE invokes the associated method in the corresponding business logic component, passes necessary information about the event to the method and executes the method. In the previous example of the user interface markup object that has several input fields, firing an event may be entering a user's phone number in the appropriate input field. The business logic component receives this markup object event, validates it and formats the phone number for display.

In the business component to markup objects binding 530, business logic components 540 can access and modify the markup objects 510 via a markup object Application Program Interface (API), or a Document Object Model (DOM) API, 531. In one embodiment, the CRE 224 parses and stores the markup document 550 into a DOM, and exposes this DOM as a set of API that can be invoked by business logic components 540. Business logic components 540 invoke this DOM API to programmatically manipulate the markup document 550 stored in the DOM. This feedback mechanism via the markup object API 531 may be "a form validation" process or an internal calculation that will result in modifying the markup objects 510. In an example of a "form validation" process the user enters in the UI a phone number that has three digits. The business logic component recognizes that a three digit phone number is not valid, rejects the input, displays an error in the UI and requests a valid phone number.

This two-way binding mechanism 500 enables the clear separation of business logic, presentation and data. The HTML and JavaScript™ interaction models in web browsers share a similar architecture. However, the present invention differs from these prior art models because it allows for object-oriented binding. The markup documents are converted into object oriented representations (markup objects) and the business logic components become program objects as well. The object-oriented binding is then a binding between these objects, i.e., the markup objects and the program objects. In the prior art example, the business logic is written as scripts, which are not object oriented, and the binding is a binding between program methods to HTML objects. This object-oriented binding of this invention allows for the development of complex applications and provides programming language and execution format independence. In other words, the business logic code may be written in any programming language including Java™, JavaScript™, C#, J#, VB™, and C#, and the markup documents may be written in any markup language including XML, text, and HTML, among others. If the programming language is not object oriented, the source code can be compiled by the universal compiler into an object oriented executable code. Several XML specifications may be used including XUL (XML User Interface Language), SVG (Scalable Vector Graphics) and XForms. The combination of these XML languages creates a rich environment that supports all functionalities of all network applications including typical Windows graphical user interface, forms, 2D graphics and animation.

Figure 7:
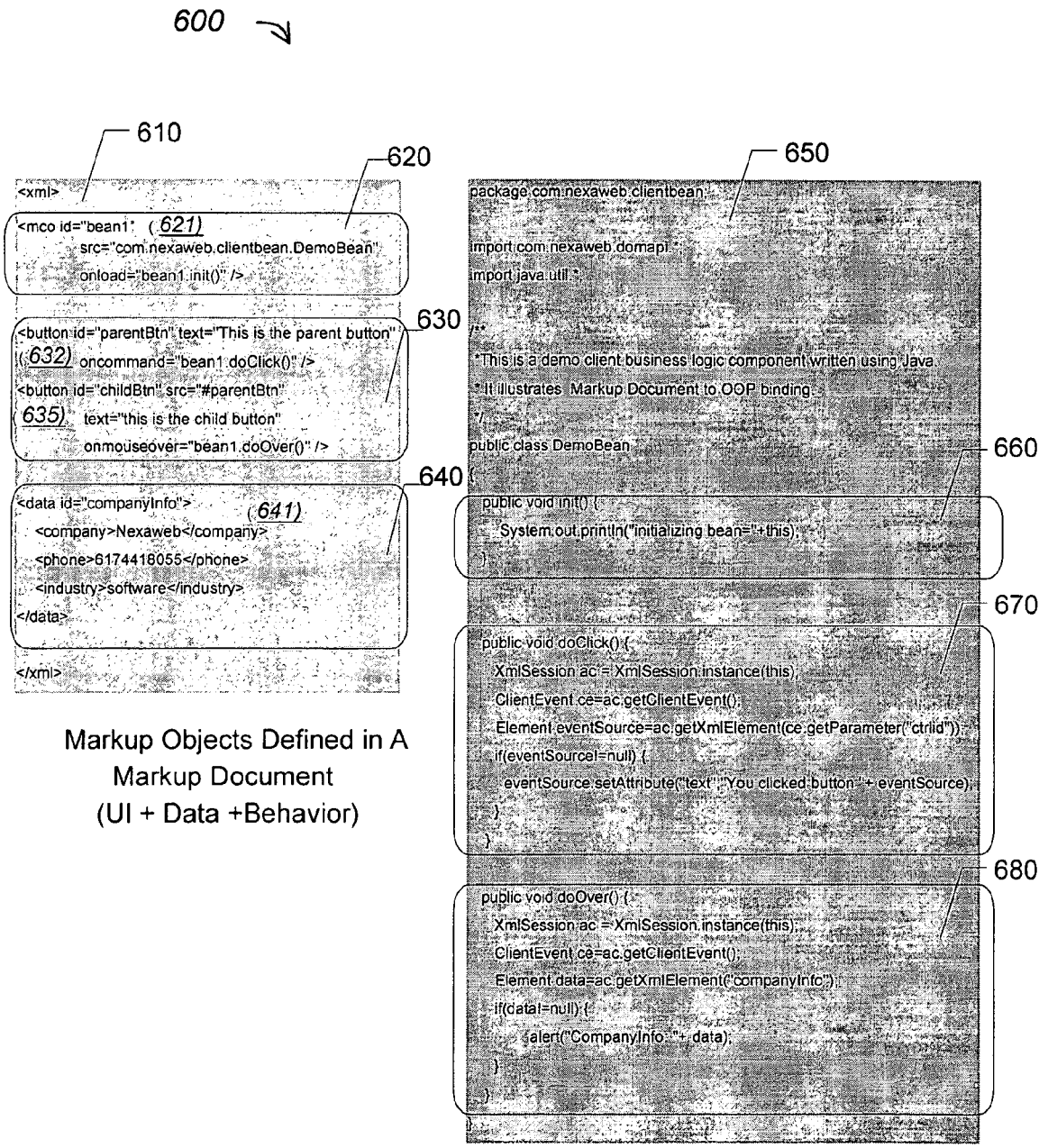
FIG. 7 is a code example of the markup-business logic binding mechanism.
Figure 7A:
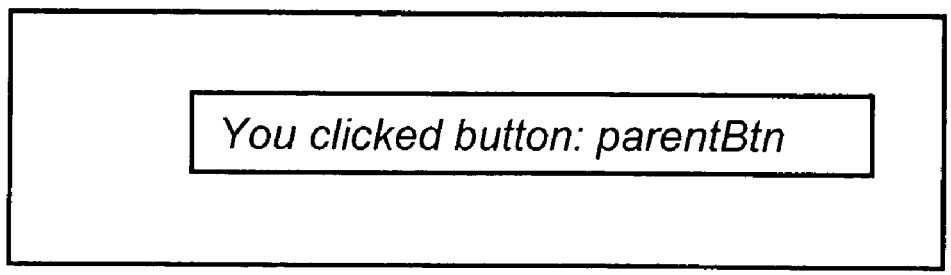
FIG. 7A is a screen shot of the example of FIG. 7.
Figure 7B:
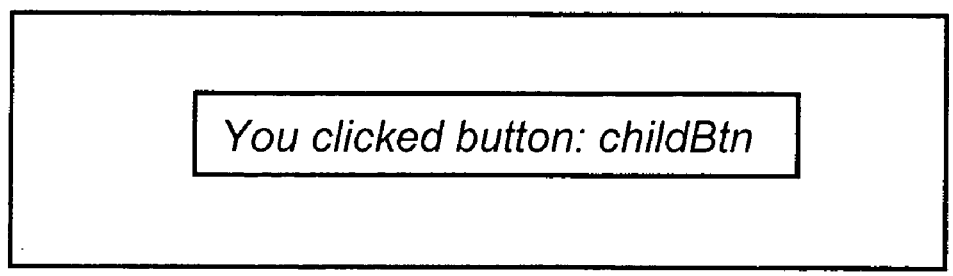
FIG. 7B is another screen shot of the example of FIG. 7.

A code example 600 of the markup-business logic binding mechanism 500 is shown in FIG. 7. A markup document 610 is written using XML. The markup document 610 defines a client-side logic object "bean1" 621, a parent button "parentBtn" 632, a child button "childBtn" 635, and a data object "companyInfo" 641. The client-side logic object "bean1" 621 defines a client-side programming object whose source code is "com.nexaweb.clientbean.DemoBean", effectively associating the business logic component 650 with this markup document 610. The source code for business logic component 650 is written using the Java programming language and defines a Java class with three different methods, including "init" 660, "doClick" 670, and "doOver" 680. The markup document to business logic binding 520 is achieved by using the three methods 660, 670, 680 of the business logic component 650 as the event handlers for events fired by the three markup objects 621, 632, and 635, respectively. Method 660 processes the "onload" event for markup object 621, method 670 processes the "oncommand" event for the parent button 633, and method 680 processes the "onmouseover" event for the child button 635. Whenever such an event happens, the CRE invokes the corresponding method in the business logic component to process it. An example of the business logic to markup binding 530 is shown in the implementation of the three methods 660, 670, 680 in the business logic component 650. For example, using the DOM API exposed by the CRE, the "doClick" method 670 inspects the event information, retrieves the event source, which should be the markup object that the user clicked, and sets the "text" attribute of this markup object to be the processed result. For example by clicking on the parent button object 632 the text "You clicked button: parentBtn" appears on the UI screen 633, as shown in FIG. 7A. Similarly, by clicking on the child button object 635 the text "You clicked button: childBtn" appears on the UI screen 636, as shown in FIG. 7B.

Figure 8:
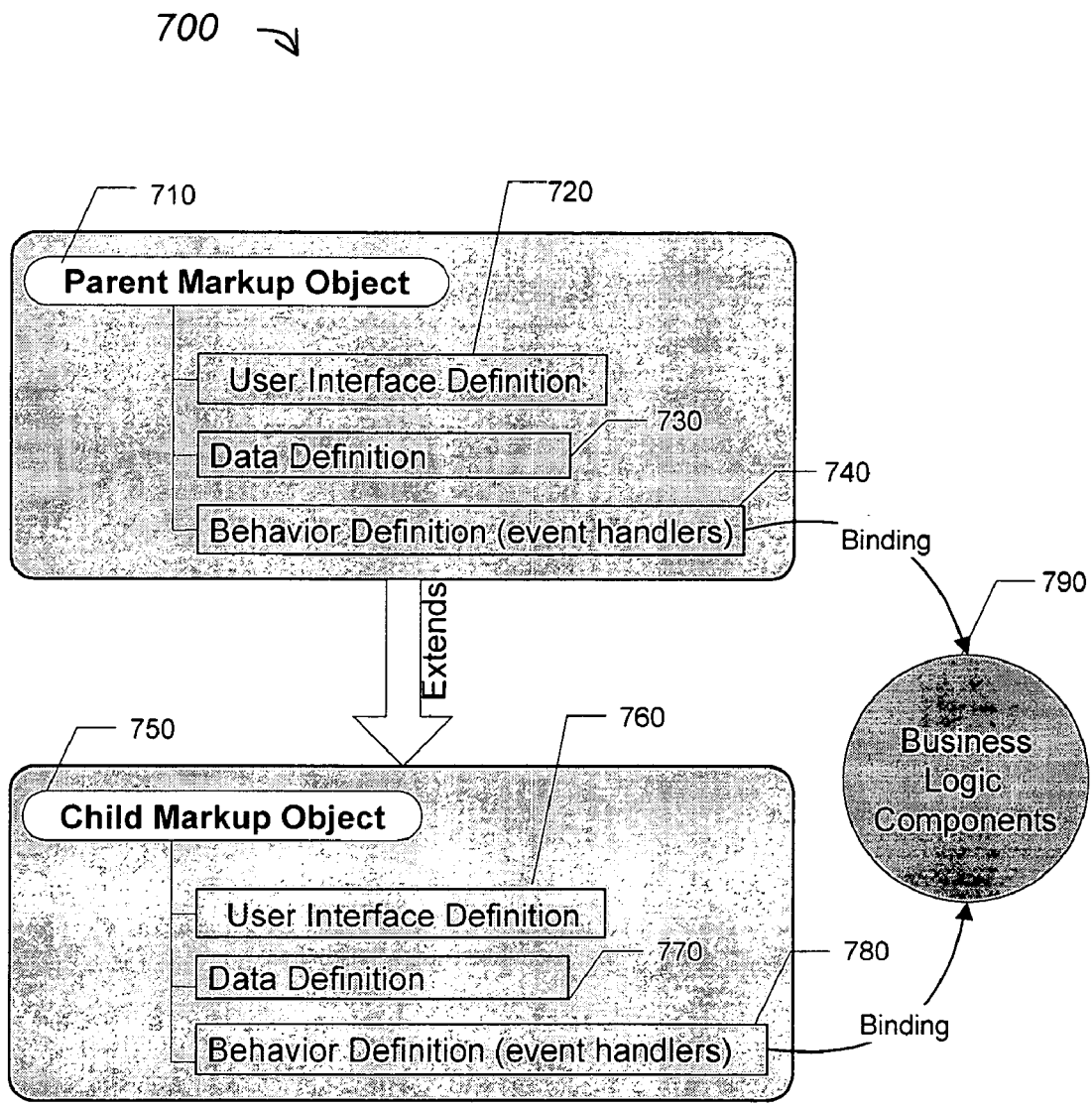
FIG. 8 is a schematic diagram of the object-oriented markup object declaration and instantiation.

FIG. 8 shows how this invention allows object-oriented markup object inheritance. This process greatly simplifies the creation and management of markup documents and increases the flexibility of markup documents. The parent markup object 710 includes a user interface definition 720, an object specific data definition 730 and object behavior (or event handler) definition 740. The child markup object 750 includes a user interface definition 760, an object specific data definition 770 and object behavior (or event handler) definition 780. The child markup object 750 inherits all these UI, data and behavior definitions 760,770 and 780, respectively, from the parent markup object 710. The child markup object 750 can also optionally overwrite the corresponding parent definitions and add new definitions. This object-oriented approach allows for inheriting and changing not only object attributes, but also allows for entire different object behavior by replacing the parent object's event handler definition with child specific event handlers. Referring back to the code example of FIG. 7, the "childBtn" 635 inherits all definitions (UI, data and behavior) from the "parentBtn" 632. However, markup object specific data are changed, i.e., the "id" is changed from "parentBtn" to "childBtn". Similarly the user interface definition is changed, i.e., the value of "text" attribute is changed so that the text "You clicked button: childBtn" is displayed instead of "You clicked button: parentBtn". The "childBtn" inherits the object behavior from "parentBtn" so that the "oncommand" event will invoke the "bean1.doClick ( )" method 670 for the child markup object, as well. The child markup object 750 also modifies the behavior definition of the parent markup object 710 by binding the "bean1.doOver ( )" method 680 to the "onmouseover" event so that the "onmouseover" event will invoke the "bean1.doOver ( )" method 680 for the parent markup object, as well.

Figure 9:
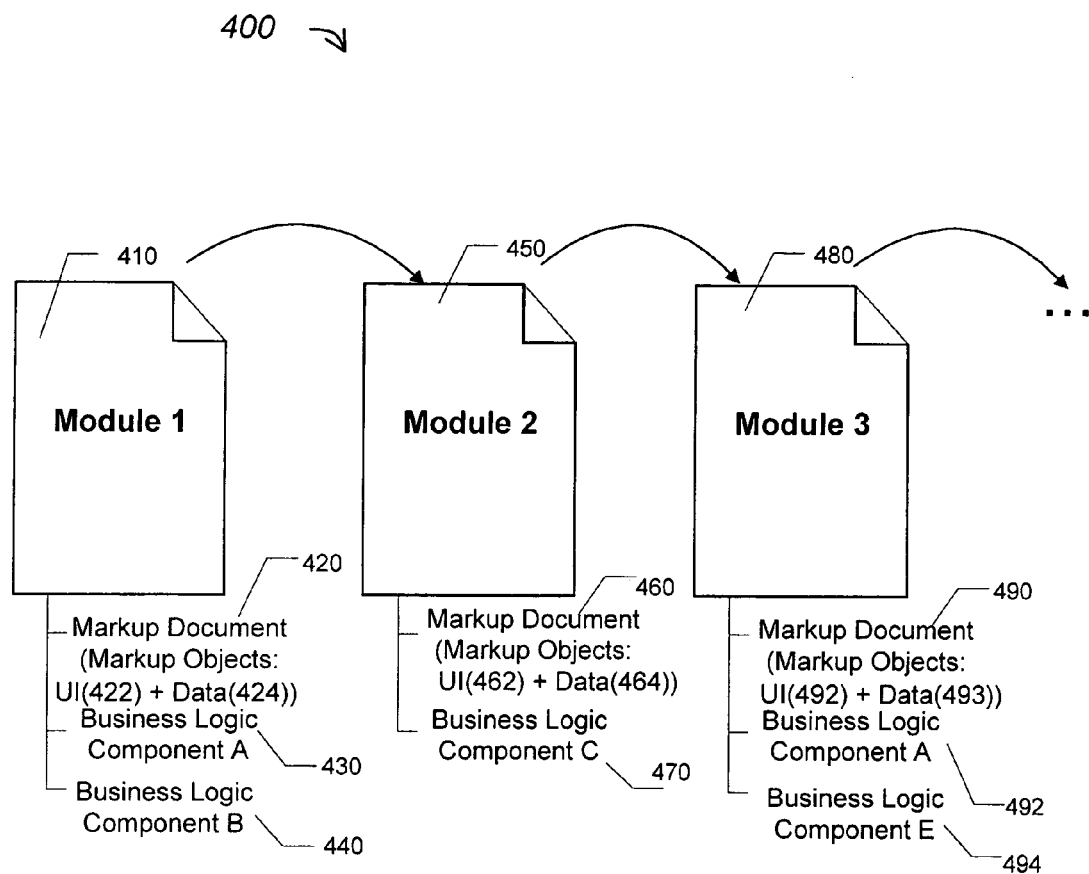
FIG. 9 is a schematic diagram of the module structure of a network-based application according to this invention.

Application programs are typically multi-megabyte files. Loading such big files into memory creates lengthy delays for users and places great demands on the hardware components because it requires faster CPU, bigger memory, more storage, and a faster network, all of which translate into costs and performance issues. The present invention solves these problems by separating the application code into small independent modules each of which can be downloaded and executed independently. Referring to FIG. 9, application code 400 includes N number of modules, Module 1 (410), Module 2 (450), Module 3 (480), . . . Module N (not shown). Each module includes one or more markup documents and optionally one or more business logic components. In the example of FIG. 9, Module 1 (410) includes a markup document 420 and business logic components A (430) and B (440). Markup document 420 defines two markup objects, i.e., a User Interface (UI) 422 and a Data file 424. Module 2 (450) includes a business logic component C (470) and a markup document 460 defining a User Interface 462 and a Data file 464. Module 3 (480) includes business logic component A (430), business logic component E (494) and a markup document 490 defining a User Interface 492 and a Data file 493. Different modules may share business logic components. For example, Module 3 (480) uses the same business logic component A (430) as Module 1 (410). In this case the system 200 of FIG. 3 uses client-side caching 226, as well as server-side caching 216 to avoid loading the same module or component more than once. Accordingly, although the entire application code 400 is composed of many XML documents and many business logic components, each module may require only one XML document and a few compiled business logic components, therefore resulting in a small footprint for each module. This small footprint of each module enables fast application code downloading. Furthermore, once a module is downloaded in the client machine it is stored in the client caching and it can be reused in the future without requiring a new download. The server also provides for automated updating of the modules that were previously downloaded in the client machine and were stored in the client cache.

Figure 10:
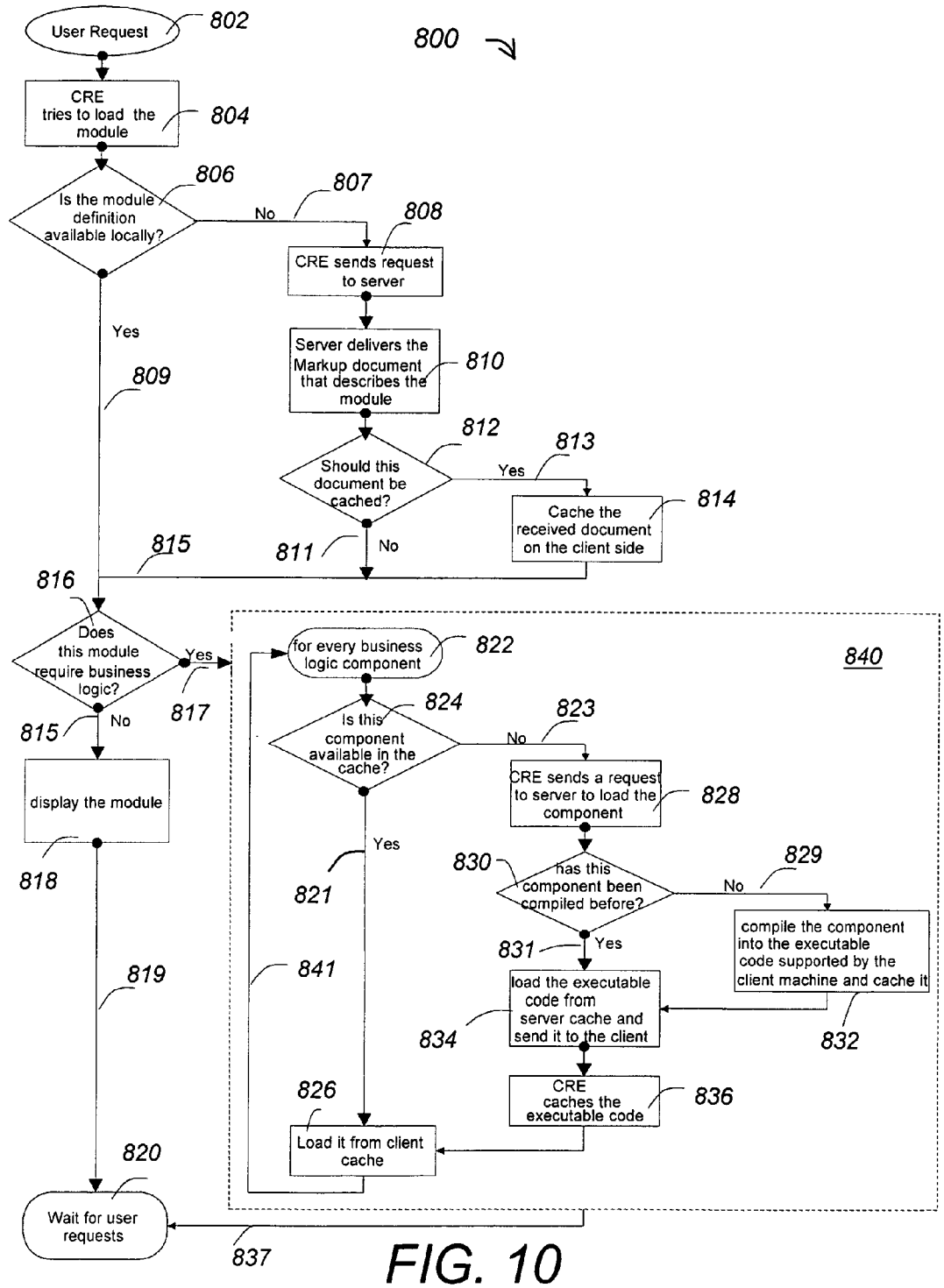
FIG. 10 is a flow diagram of the process of deploying, compiling and executing a network-based application according to this invention.

Referring to FIG. 10, the process 800 of running and application through a client machine includes the following steps. When a user wants to use a network application he starts the CRE and enters a request to start the client program (802). The CRE receives the request (804) and checks to see if the initial module is available in the local client cache (806). If the module is not available in the local cache (807), the CRE sends a request to the server (SRE) to download the specific module (808). The server delivers the markup document that describes the specific module to the CRE (810) and the CRE inquires if this markup document needs to be cached (812) by checking the document properties or configuration information. If this markup document needs to be cached (813), the CRE caches it in the local client cache (814) and then proceeds to the next question (815). Similarly, if the markup document does not need to be cached in the local client cache (811), the CRE proceeds to the next question (815). If the module is available in the local cache (809), the CRE skips the downloading process and proceeds to the next question (815), as well. Next, the CRE checks the module properties or configuration information to see if this module requires a business logic component (816). If no business logic component is required (815) the CRE displays the module to the user (818) and then waits for a user input (820). If the module requires a business logic component (817), process (840) takes place. In process (840), the CRE proceeds to check if the business logic component is available in the local cache (824). If the business logic component is available in the local cache (821), it gets loaded from the local cache (826) in the active memory. If the business logic component is not locally available (823), the CRE sends a request to the server to download the business logic component (828). The server checks if this business logic component has been compiled before for this particular client machine executable format (830), and if it has (831) it downloads the executable code from the server cache to the client cache (834). Next, the CRE stores the executable code in the client machine cache (836) and loads it in the active memory (826). If the business logic component has not been previously compiled for the specific client machine executable format (829), the server first compiles it into an executable code executable by the specific client machine execution engine and stores it in the server cache (832). Next, the server downloads the executable code from the server cache to the client cache (834), where the CRE caches it in the client cache (836) and then loads it in the active memory (826). Finally, both the markup document and the business logic component (837) are present in the active memory and wait for an input from the user (820). If there are more than one business logic components associated with a specific module the process (840) is repeated for each individual business logic component (841). The process 800 is repeated for downloading the next module and the business logic components that are associated with it. Once the CRE receives the markup language document, it immediately processes the document, executes the associated business logic and displays the result to the user. This module-type downloading and execution of a network application has the advantages of being fast and requiring low bandwidth. The storing of the previously downloaded modules and associated business logic in the client-side cache and the server cache and the synchronization of the client-side cache with the server cache allows the client machine to execute the network application offline, even in the case when the network connection is not available.

Figure 11:
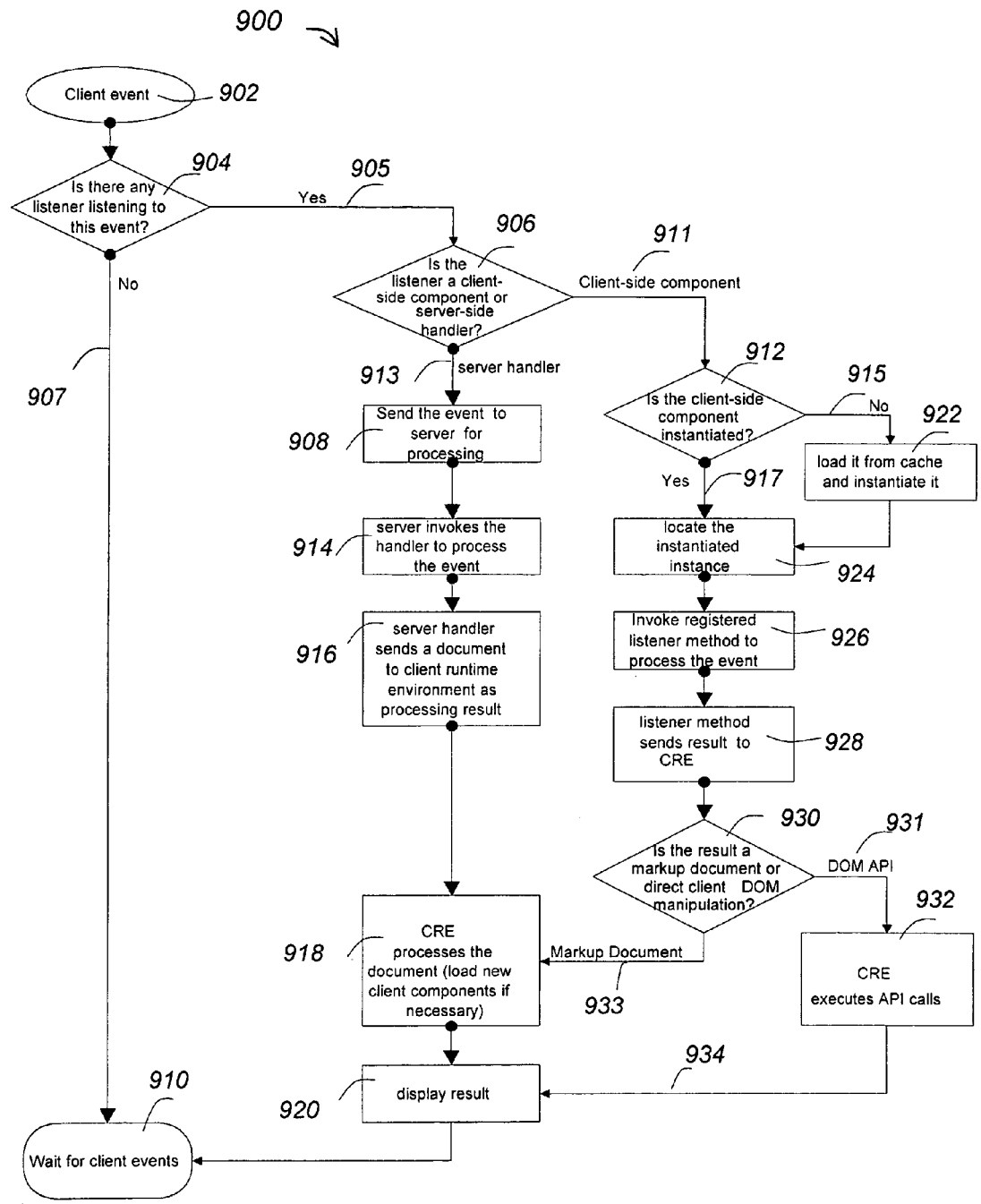
FIG. 11 is a flow diagram of the event handing process of this invention.

Once the appropriate modules are brought in the active memory of the client machine the user interacts directly with the application through client events. Client events include among others, entering text in a screen field, moving the mouse over text or a screen button, clicking the mouse, highlighting a button in the screen, drag & drop, a window is hidden, and new data is available. FIG. 11 depicts how the system handles the client events (900). When a client event happens (902), the CRE checks if there is a listener listening to this event (904). If there is no listener listening to this event (907) the CRE waits for a new client event (910). If there is a listener listening to this event (905), the CRE determines if the listener is a business logic component in the client side or a server-side event handler (906). If the listener is a client-side business logic component (911), the CRE checks if this client-side business logic component is instantiated, i.e., the business logic component has been created and initialized in the memory (912). If the client-side business component is not instantiated (915) the CRE loads it from the cache and instantiates it (922). If the client-side business component is instantiated the CRE locates the instantiated instance (924), and invokes the registered listener method for handling this event (926). The CRE processes the event according to the client-side business component listener method and produces a result (928). Next the CRE checks if the result is a markup document or a direct client DOM manipulation through an API (930). If the result is a markup document 933 the CRE processes the markup document (918) and displays the result (920). If the result is a direct client DOM manipulation through the API (931) the CRE executes the API calls (932) and displays the result (920). DOM modifications result in changes in the application state which may be changes entered through the user interface or internal data changes. The system then waits for a new client event (910). A client-side listening component may be a client side business logic component, macro statements defined in markup documents, and local URL invocations, among others. A server-side event handler may be a Java server page, a web service call, a servlet, and an Active Server Page, among others. In one example, the application state is maintained in an XML Document Object Model (DOM). This DOM is maintained on the client side by the CRE and by the server. When the user interacts with the application, the CRE updates the client side DOM accordingly to reflect the user's inputs. When the application's server-side business logic dictates a change in the state of the application, for example, making a Window invisible, the server automatically updates the server side DOM. Whenever either the client side or the server side DOM is updated, either the CRE or the server send a message to the corresponding party to synchronize its DOM, respectively. When the network is disconnected, the application is still available because business logic code and markup documents have been cached on the client side, and the application state is available on the client side as well. Changes of the application state are maintained in the DOM. When the network connection becomes available, the client runtime and server runtime automatically synchronize the DOM.

Other embodiments are within the scope of the following claims. For example, instead of downloading one module at a time, the server may package a group of modules together, or all modules together into one deployment module and downloads this deployment module to the client machine. This is particularly useful for the purpose of offline computing where all required offline computing functionality and data can be packaged into one deployment module and downloaded to the client machine at once. After such downloading, the deployment module can run on the client machine without any connectivity until further modules or data are required.

Several embodiments of the present invention have been described. Nevertheless, it will be understood that various modifications may be made without departing from the spirit and scope of the invention. Accordingly, other embodiments are within the scope of the following claims.

What is claimed is:

1. A universal compiler stored in a computer and adapted to receive a plurality of input files, and convert any of said plurality of input files into an output file, wherein said plurality of input files comprise a source code of an application written in a plurality of different programming languages, respectively, and said output file comprises an executable code of said application, and wherein said executable code is directly executable by an execution engine, said universal compiler comprising;

a plurality of specific programming language compilers, wherein each of said plurality of specific programming language compilers is adapted to receive an input file from said plurality of input files comprising said source code of said application written in a specific programming language and to convert said input file into a specific executable code of said application, wherein said specific executable code is directly executable by a specific execution engine; and a control logic for selecting a specific programming language compiler from said plurality of specific programming language compilers.

2. The universal compiler of claim 1 wherein said programming languages are selected from a group consisting of Java™, JavaScript™, C#, C+, C++, Visual Basic™, J#, ActionScript, XSL, XQuery, and XPath™.

3. The universal compiler of claim 1 wherein said executable code comprises a Java™ Virtual Machine bytecode and said execution engine comprises a Java™ Virtual Machine.

4. The universal compiler of claim 1 wherein said executable code comprises a .NET Common Language Runtime (CLR) bytecode and said execution engine comprises a .NET CLR engine.

5. The universal compiler of claim 1 wherein said executable code comprises a Flash player bytecode and said execution engine comprises a Flash player.

6. A compiler system stored in a computer and adapted to receive a plurality of input files, and convert any of said plurality of input files into a plurality of output files, wherein said plurality of input file comprises a source code of an application written in a plurality of different programming languages, respectively, and said plurality of output files comprise a plurality of executable codes of said application, respectively, and wherein said plurality of executable codes are executable by a plurality of execution engines, respectively, said compiler system comprising;

a plurality of universal compilers wherein each universal compiler comprises a plurality of specific programming language compilers, and wherein said plurality of specific programming language compilers are adapted to receive an input file from said plurality of input files comprising said source code of said application written in a specific programming language and to convert said input file into a specific executable code of said application, wherein said specific executable code is executable by a specific execution engine; and a first control logic for selecting a universal programming language compiler from said plurality of universal programming language compilers.

7. The compiler system of claim 6 further comprising a second control logic for caching said plurality of executable codes.

8. The compiler system of claim 6 wherein said programming languages are selected from a group consisting of Java™, JavaScript™, C#, C+, C++, Visual Basic™, J#, ActionScript, XSL, XQuery, and XPath™.

9. The compiler system of claim 6 wherein said executable codes are selected from a group consisting of a Java™ Virtual Machine bytecode, a .NET CLR bytecode, a Flash player bytecode, a Palm™ OS bytecode, Symbian OS™ bytecode, and Qualcomm Brew bytecode, and said corresponding execution engines are selected from a group consisting of a Java™ Virtual Machine, a .NET CLR engine, a Flash player, Palm™ OS, Symbian OS™, and Qualcomm Brew engine, respectively.

10. A distributed computing system comprising:
a server including a universal compiler, wherein said universal compiler is adapted to receive a plurality of input files, and convert any of said plurality of input files into an output file, wherein said plurality of input files comprise a source code of an application written in a plurality of programming languages, respectively, and said output file comprises an executable code of said application, said universal compiler comprising a plurality of specific programming language compilers, wherein each of said plurality of specific programming language compilers is adapted to receive an input file from said plurality of input files comprising said source code of said application written in a specific programming language and to convert said input file into a specific executable code of said application, wherein said specific executable code is executable by a specific execution engine and said universal compiler further comprising a control logic for selecting a specific programming language compiler from said plurality of specific programming language compilers; and
at least one client machine adapted to connect to said server via a network and comprising an execution engine adapted to receive said output file over said network and to execute said executable code.

11. A distributed computing system comprising:
a server including a compiler system adapted to receive a plurality of input files, and convert any of said plurality of input files into a plurality of output files, wherein said plurality of input files comprise a source code of an application written in a plurality of different programming languages, respectively, and said plurality of output files comprise a plurality of corresponding executable codes of said application, respectively, said compiler system comprising a plurality of universal compilers wherein each universal compiler comprises a plurality of specific programming language compilers, and wherein said plurality of specific programming language compilers are adapted to receive an input file from said plurality of input files comprising said source code of said application written in a specific programming language and to convert said input file into a specific executable code of said application, wherein said specific executable code is executable by a specific execution engine, and said compiler system further comprising a first control logic for selecting a universal programming language compiler from said plurality of universal programming language compilers; and a plurality of client machines, wherein each of said plurality of client machines is adapted to connect to said server via a network and comprises an execution engine adapted to receive one of said output files and to execute the corresponding executable code.

12. A universal XML compiler stored in a computer and adapted to receive a plurality of input files, and convert any of said plurality of input files into an output file, wherein said plurality of input files comprise a plurality of markup documents written in a plurality of different XML languages, respectively, and said output file comprises an executable code, and wherein said executable code is executable by a certain execution engine, said universal XML compiler comprising:
a plurality of specific XML language compilers, wherein each of said plurality of specific XML language compilers is adapted to receive an input file from said plurality of input files comprising said markup documents written in a specific XML language and to convert said input file into an executable code, wherein said executable code is executable by a certain execution engine; and
a control logic for selecting a specific XML language compiler from said plurality of specific XML language compilers.

13. The universal XML compiler of claim 12 wherein said XML languages are selected from a group consisting of XML, XUL, SVG, Xforms, XAML, HTML, XHTML™, HTML related languages, and combinations thereof.

14. The universal compiler of claim 12 wherein said executable code comprises an XML language format and said certain execution engine comprises an XML execution engine.

15. The universal compiler of claim 12 wherein said executable code comprises a binary format and said certain execution engine comprises an engine that executes said binary format.

16. The universal compiler of claim 15 wherein said binary format is selected from a group consisting of Java™ Virtual Machine bytecode, .NET CLR bytecode, Palm™ OS bytecode, Flash player bytecode, Symbian OS™ bytecode, and Qualcomm Brew bytecode.

17. The universal compiler of claim 16 wherein said certain execution engine is selected from a group consisting of Java™ Virtual Machine, .NET CLR, Palm™ OS, Flash player, Symbian OS™, and Qualcomm Brew.

18. A method of compiling a source code of an application by a universal compiler comprising:
providing a plurality of input files wherein said plurality of input files comprise said source code written in a plurality of different programming languages, respectively;
compiling any of said plurality of input files into an executable code, wherein said executable code is executable by an execution engine;
wherein said universal compiler comprises a plurality of specific programming language compilers, wherein each of said plurality of specific programming language compilers is adapted to receive an input file comprising said source code written in a specific programming language and to convert said input file into a specific executable code of said application, wherein said specific executable code is executable by a specific execution engine; and wherein said universal compiler further comprises a control logic for selecting a specific programming language compiler from said plurality of specific programming language compilers.

19. The method of claim 18 wherein said programming languages are selected from a group consisting of Java™, JavaScript™, C#, C+, C++, Visual Basic™, J#, ActionScript, XSL, XQuery, and XPath™.

20. The method of claim 18 wherein said executable code comprises a Java™ bytecode and said execution engine comprises a Java Virtual Machine.

21. The method of claim 18 wherein said executable code comprises a .NET CLR bytecode and said execution engine comprises a .NET CLR engine.

22. The method of claim 18 wherein said executable code comprises a Flash player bytecode and said execution engine comprises a Flash player.

23. A method of compiling a source code of an application by a compiler system comprising:

providing a plurality of input files wherein said input files comprise said source code written in a plurality of different programming languages, respectively; and compiling any of said plurality of input files into a plurality of output files wherein said plurality of output files comprise a plurality of executable codes of said source code, respectively, wherein said executable codes are executable by a plurality of corresponding execution engines, respectively;

wherein said compiler system comprises a plurality of universal compilers wherein each universal compiler comprises a plurality of specific programming language compilers, and wherein said plurality of specific programming language compilers are adapted to receive an input file from said plurality of input files comprising said source code of said application written in a specific programming language and to convert said input file into a specific executable code of said application, wherein said specific executable code is executable by a specific execution engine; and wherein said compiler system further comprises a first control logic for selecting a universal programming language compiler from said plurality of universal programming language compilers.

24. The method of claim 23 wherein said programming languages are selected from a group consisting of Java™, JavaScript™, C#, C+, C++, Visual Basic™, J#, ActionScript, XSL, XQuery, and XPath™.

25. The method of claim 23 wherein said executable codes are selected from a group consisting of Java™ Virtual Machine bytecode, .NET CLR bytecode, Palm™ OS bytecode, Flash player bytecode, Symbian OS™ bytecode, and Qualcomm Brew bytecode and said corresponding execution engines are selected from a group consisting of a Java™ Virtual Machine, a .NET CLR, a Palm™ OS, a Flash Player, a Symbian OS™, and a Qualcomm Brew, respectively.

* * * * *